United States Patent
Muto et al.

(10) Patent No.: US 7,999,706 B2
(45) Date of Patent: Aug. 16, 2011

(54) CHARACTERISTIC ACQUISITION DEVICE, METHOD AND PROGRAM

(75) Inventors: Masahiko Muto, Saitama (JP); Hideki Ichikawa, Saitama (JP)

(73) Assignee: Advantest Corporation, Tokyo (JP)

( * ) Notice: Subject to any disclaimer, the term of this patent is extended or adjusted under 35 U.S.C. 154(b) by 0 days.

(21) Appl. No.: 12/294,629

(22) PCT Filed: Apr. 6, 2007

(86) PCT No.: PCT/JP2007/058122
§ 371 (c)(1),
(2), (4) Date: Apr. 26, 2010

(87) PCT Pub. No.: WO2007/123056
PCT Pub. Date: Nov. 1, 2007

(65) Prior Publication Data
US 2011/0018749 A1    Jan. 27, 2011

(30) Foreign Application Priority Data
Apr. 17, 2006   (JP) .................. 2006-112914

(51) Int. Cl.
*H03M 1/06*    (2006.01)
(52) U.S. Cl. .................. 341/118; 341/155; 341/144
(58) Field of Classification Search .......... 341/118–120, 341/144, 155
See application file for complete search history.

(56) References Cited

U.S. PATENT DOCUMENTS

| | | | |
|---|---|---|---|
| 5,515,047 A | 5/1996 | Yamakido et al. | |
| 6,411,245 B2 * | 6/2002 | Oka | 341/155 |
| 7,522,077 B1 * | 4/2009 | Itkin | 341/120 |
| 2004/0032358 A1 | 2/2004 | Asami | |
| 2008/0036470 A1 | 2/2008 | Kurosawa | |

FOREIGN PATENT DOCUMENTS

| | | |
|---|---|---|
| JP | 61-005625 A | 1/1986 |
| JP | 06-021816 A | 1/1994 |
| JP | 06-303137 A | 10/1994 |
| JP | 11-017540 A | 1/1999 |
| JP | 2002-246910 A | 8/2002 |
| JP | 2006-086731 A | 3/2006 |

OTHER PUBLICATIONS

English language Abstract of JP 2006-086731, Mar. 30, 2006.
English language Abstract of JP 11-017540, Jan. 22, 1999.
English language Abstract of JP 06-021816, Jan. 28, 1994.
English language Abstract of JP 06-303137, Oct. 28, 1994.
English language Abstract of JP 61-005625, Jan. 11, 1986.
English language Abstract of JP 2002-246910, Aug. 30, 2002.

* cited by examiner

*Primary Examiner* — Brian Young
(74) *Attorney, Agent, or Firm* — Greenblum & Bernstein, P.L.C.

(57) ABSTRACT

It is possible to reduce errors generated between multiple D/A conversion paths. A characteristic acquisition device includes [1] an arbitrary signal generator that converts a first (second) input digital pattern into a first (second) output analog pattern, [2] a digitizer that converts a first input analog pattern into a first output digital pattern, and [3] a characteristic acquisition device that includes a first transmission characteristic deriving unit that derives a first transmission characteristic which converts the first input digital pattern into the output digital pattern where the input analog pattern is the first output analog pattern, a second transmission characteristic deriving unit that derives a second transmission characteristic which converts the second input digital pattern into the output digital pattern where the input analog pattern is the second output analog pattern, and a transmission characteristic ratio deriving unit that derives a transmission characteristic ratio which is a ratio relating to the first transmission characteristic and the second transmission characteristic.

19 Claims, 11 Drawing Sheets

CHARACTERISTIC ACQUISITION DEVICE, METHOD AND PROGRAM

TECHNICAL FIELD

The present invention relates to correction of a balance between two signals generated by a signal generator, and a balance between the two signals received by a digitizer for processing the two signals.

BACKGROUND ART

Conventionally, it has been known that there exist, in sampling, amplitude errors and phase errors among multiple A/D converters used in a digitizer (refer to Object of Abstract of Japanese Laid-Open Patent Publication No. 2002-246910, for example).

Similarly, it has been known that there exist amplitude errors and phase errors among multiple D/A converters used in a signal generator such as an arbitrary waveform generator (AWG).

It is therefore an object of the present invention to reduce errors generated among multiple A/D conversion paths and among multiple D/A conversion paths.

DISCLOSURE OF THE INVENTION

One aspect of the present invention is a first characteristic acquisition device which receives patterns from an analog pattern generation device and a digital pattern acquisition device, thereby acquiring a characteristic of the analog pattern generation device, wherein: [1] the analog pattern generation device converts a first input digital pattern into a first output analog pattern, and converts a second input digital pattern into a second output analog pattern; [2] the digital pattern acquisition device converts an input analog pattern into an output digital pattern; and [3] the characteristic acquisition device includes: a first transmission characteristic deriving unit that derives a first transmission characteristic which converts the first input digital pattern into the output digital pattern where the input analog pattern is the first output analog pattern; a second transmission characteristic deriving unit that derives a second transmission characteristic which converts the second input digital pattern into the output digital pattern where the input analog pattern is the second output analog pattern; and a transmission characteristic ratio deriving unit that derives a transmission characteristic ratio which is a ratio relating to the first transmission characteristic and the second transmission characteristic.

According to the thus constructed present invention, a first characteristic acquisition device, which receives patterns from an analog pattern generation device and a digital pattern acquisition device, thereby acquiring a characteristic of the analog pattern generation device, can be provided.

[1] The analog pattern generation device converts a first input digital pattern into a first output analog pattern, and converts a second input digital pattern into a second output analog pattern.

[2] The digital pattern acquisition device converts an input analog pattern into an output digital pattern.

[3] The characteristic acquisition device includes: a first transmission characteristic deriving unit, a second transmission characteristic deriving unit and a transmission characteristic ratio deriving unit.

The first transmission characteristic deriving unit derives a first transmission characteristic which converts the first input digital pattern into the output digital pattern where the input analog pattern is the first output analog pattern. The second transmission characteristic deriving unit derives a second transmission characteristic which converts the second input digital pattern into the output digital pattern where the input analog pattern is the second output analog pattern. The transmission characteristic ratio deriving unit derives a transmission characteristic ratio which is a ratio relating to the first transmission characteristic and the second transmission characteristic.

According to the present invention, the first characteristic acquisition device may include a transmission characteristic deriving unit that derives a second generation-side transmission characteristic which converts the second input digital pattern into the second output analog pattern by multiplying a first generation-side transmission characteristic which converts the first input digital pattern into the first output analog pattern by the transmission characteristic ratio.

According to another aspect of the present invention is a second characteristic acquisition device which receives patterns from an analog pattern generation device and a digital pattern acquisition device, thereby acquiring a characteristic of the digital pattern acquisition device, wherein: [1] the analog pattern generation device converts an input digital pattern into an output analog pattern; [2] the digital pattern acquisition device converts a first input analog pattern into a first output digital pattern, and converts a second input analog pattern into a second output digital pattern; and [3] the characteristic acquisition device includes: a first transmission characteristic deriving unit that derives a first transmission characteristic which converts the input digital pattern into the first output digital pattern where the first input analog pattern is the output analog pattern; a second transmission characteristic deriving unit that derives a second transmission characteristic which converts the input digital pattern into the second output digital pattern where the second input analog pattern is the output analog pattern; and a transmission characteristic ratio deriving unit that derives a transmission characteristic ratio which is a ratio relating to the first transmission characteristic and the second transmission characteristic.

According to the thus constructed present invention, a second characteristic acquisition device, which receives patterns from an analog pattern generation device and a digital pattern acquisition device, thereby acquiring a characteristic of the digital pattern acquisition device, can be provided.

[1] The analog pattern generation device converts an input digital pattern into an output analog pattern.

[2] The digital pattern acquisition device converts a first input analog pattern into a first output digital pattern, and converts a second input analog pattern into a second output digital pattern.

[3] The characteristic acquisition device includes a first transmission characteristic deriving unit, a second transmission characteristic deriving unit and a transmission characteristic ratio deriving unit.

The first transmission characteristic deriving unit derives a first transmission characteristic which converts the input digital pattern into the first output digital pattern where the first input analog pattern is the output analog pattern. The second transmission characteristic deriving unit derives a second transmission characteristic which converts the input digital pattern into the second output digital pattern where the second input analog pattern is the output analog pattern. The transmission characteristic ratio deriving unit derives a transmission characteristic ratio which is a ratio relating to the first transmission characteristic and the second transmission characteristic.

According to the present invention, the second characteristic acquisition device may include a transmission characteristic deriving unit that derives a second acquisition-side transmission characteristic which converts the second input analog pattern into the second output digital pattern by multiplying a first acquisition-side transmission characteristic which converts the first input analog pattern into the first output digital pattern by the transmission characteristic ratio.

Another aspect of the present invention is a third characteristic acquisition device which receives patterns from an analog pattern generation device and a digital pattern acquisition device, thereby acquiring a delay characteristic in a transmission path from the analog pattern generation device to the digital pattern acquisition device, wherein: [1] the analog pattern generation device converts a first input digital pattern to a first output analog pattern, and converts a second input digital pattern into a second output analog pattern; [2] the digital pattern acquisition device converts a first input analog pattern into a first output digital pattern, and converts a second input analog pattern into a second output digital pattern; and [3] the characteristic acquisition device includes: a first straight transmission characteristic deriving unit that derives a first straight transmission characteristic which converts the first input digital pattern into the first output digital pattern where the first input analog pattern is the first output analog pattern; a first cross transmission characteristic deriving unit that derives a first cross transmission characteristic which converts the first input digital pattern into the second output digital pattern where the second input analog pattern is the first output analog pattern; a second straight transmission characteristic deriving unit that derives a second straight transmission characteristic which converts the second input digital pattern into the second output digital pattern where the second input analog pattern is the second output analog pattern; a second cross transmission characteristic deriving unit that derives a second cross transmission characteristic which converts the second input digital pattern into the first output digital pattern where the first input analog pattern is the second output analog pattern; and a delay characteristic deriving unit that derives the delay characteristic based on the first straight transmission characteristic, the first cross transmission characteristic, the second straight transmission characteristic, and the second cross transmission characteristic.

According to the thus constructed present invention, a third characteristic acquisition device, which receives patterns from an analog pattern generation device and a digital pattern acquisition device, thereby acquiring a delay characteristic in a transmission path from the analog pattern generation device to the digital pattern acquisition device, can be provided.

[1] The analog pattern generation device converts a first input digital pattern to a first output analog pattern, and converts a second input digital pattern into a second output analog pattern.

[2] The digital pattern acquisition device converts a first input analog pattern into a first output digital pattern, and converts a second input analog pattern into a second output digital pattern.

[3] The characteristic acquisition device includes: a first straight transmission characteristic deriving unit, a first cross transmission characteristic deriving unit, a second straight transmission characteristic deriving unit, a second cross transmission characteristic deriving unit and a delay characteristic deriving unit.

The first straight transmission characteristic deriving unit derives a first straight transmission characteristic which converts the first input digital pattern into the first output digital pattern where the first input analog pattern is the first output analog pattern. The first cross transmission characteristic deriving unit derives a first cross transmission characteristic which converts the first input digital pattern into the second output digital pattern where the second input analog pattern is the first output analog pattern. The second straight transmission characteristic deriving unit that derives a second straight transmission characteristic which converts the second input digital pattern into the second output digital pattern where the second input analog pattern is the second output analog pattern. The second cross transmission characteristic deriving unit that derives a second cross transmission characteristic which converts the second input digital pattern into the first output digital pattern where the first input analog pattern is the second output analog pattern. The delay characteristic deriving unit that derives the delay characteristic based on the first straight transmission characteristic, the first cross transmission characteristic, the second straight transmission characteristic, and the second cross transmission characteristic.

According to the present invention, the third characteristic acquisition device may include a generation-side transmission characteristic ratio deriving unit that derives a generation-side transmission characteristic ratio which is obtained by dividing the second cross transmission characteristic by a product of the first straight transmission characteristic and the delay characteristic.

According to the present invention, the third characteristic acquisition device may include a generation-side transmission characteristic deriving unit that derives a second generation-side transmission characteristic which converts the second input digital pattern into the second output analog pattern by multiplying a first generation-side transmission characteristic which converts the first input digital pattern into the first output analog pattern by the generation-side transmission characteristic ratio.

According to the present invention, the third characteristic acquisition device may include an acquisition-side transmission characteristic ratio deriving unit that derives an acquisition-side transmission characteristic ratio which is obtained by dividing the first cross transmission characteristic by a product of the first straight transmission characteristic and the delay characteristic.

According to the present invention, the third characteristic acquisition device may include an acquisition-side transmission characteristic deriving unit that derives a second acquisition-side transmission characteristic which converts the second input analog pattern into the second output digital pattern by multiplying a first acquisition-side transmission characteristic which converts the first input analog pattern into the first output digital pattern by the acquisition-side transmission characteristic ratio.

Another aspect of the present invention is a characteristic acquisition method of receiving patterns from an analog pattern generation device and a digital pattern acquisition device, and thereby acquiring a characteristic of the analog pattern generation device, wherein: [1] the analog pattern generation device converts a first input digital pattern into a first output analog pattern, and converts a second input digital pattern into a second output analog pattern; [2] the digital pattern acquisition device converts an input analog pattern into an output digital pattern; and [3] the characteristic acquisition method includes: a first transmission characteristic deriving step that derives a first transmission characteristic which converts the first input digital pattern into the output digital pattern where the input analog pattern is the first output analog pattern; a second transmission characteristic deriving step that derives a second transmission characteristic which converts the second input digital pattern into the output digital pattern where the input analog pattern is the second output analog pattern and a transmission characteristic ratio deriving step that derives a transmission characteristic ratio which is a ratio relating to the first transmission characteristic and the second transmission characteristic.

Another aspect of the present invention is a characteristic acquisition method of receiving patterns from an analog pattern generation device and a digital pattern acquisition device, and thereby acquiring a characteristic of the digital pattern acquisition device, wherein: [1] the analog pattern generation device converts an input digital pattern into an output analog pattern; [2] the digital pattern acquisition device converts a first input analog pattern into a first output digital pattern, and converts a second input analog pattern into a second output digital pattern; and [3] the characteristic acquisition method includes: a first transmission characteristic deriving step that derives a first transmission characteristic which converts the input digital pattern into the first output digital pattern where the first input analog pattern is the output analog pattern; a second transmission characteristic deriving step that derives a second transmission characteristic which converts the input digital pattern into the second output digital pattern where the second input analog pattern is the output analog pattern; and a transmission characteristic ratio deriving step that derives a transmission characteristic ratio which is a ratio relating to the first transmission characteristic and the second transmission characteristic.

Another aspect of the present invention is a characteristic acquisition method of receiving patterns from an analog pattern generation device and a digital pattern acquisition device, and thereby acquiring a delay characteristic in a transmission path from the analog pattern generation device to the digital pattern acquisition device, wherein: [1] the analog pattern generation device converts a first input digital pattern to a first output analog pattern, and converts a second input digital pattern into a second output analog pattern; [2] the digital pattern acquisition device converts a first input analog pattern into a first output digital pattern, and converts a second input analog pattern into a second output digital pattern; and [3] the characteristic acquisition method includes: a first straight transmission characteristic deriving step that derives a first straight transmission characteristic which converts the first input digital pattern into the first output digital pattern where the first input analog pattern is the first output analog pattern; a first cross transmission characteristic deriving step that derives a first cross transmission characteristic which converts the first input digital pattern into the second output digital pattern where the second input analog pattern is the first output analog pattern; a second straight transmission characteristic deriving step that derives a second straight transmission characteristic which converts the second input digital pattern into the second output digital pattern where the second input analog pattern is the second output analog pattern; a second cross transmission characteristic deriving step that derives a second cross transmission characteristic which converts the second input digital pattern into the first output digital pattern where the first input analog pattern is the second output analog pattern; and a delay characteristic deriving step that derives the delay characteristic based on the first straight transmission characteristic, the first cross transmission characteristic, the second straight transmission characteristic, and the second cross transmission characteristic.

Another aspect of the present invention is a program of instructions for execution by the computer to perform a characteristic acquisition process of receiving patterns from an analog pattern generation device and a digital pattern acquisition device, and thereby acquiring a characteristic of the analog pattern generation device, wherein: [1] the analog pattern generation device converts a first input digital pattern into a first output analog pattern, and converts a second input digital pattern into a second output analog pattern; and [2] the digital pattern acquisition device converts an input analog pattern into an output digital pattern, the characteristic acquisition process including: a first transmission characteristic deriving step that derives a first transmission characteristic which converts the first input digital pattern into the output digital pattern where the input analog pattern is the first output analog pattern; a second transmission characteristic deriving step that derives a second transmission characteristic which converts the second input digital pattern into the output digital pattern where the input analog pattern is the second output analog pattern; and a transmission characteristic ratio deriving step that derives a transmission characteristic ratio which is a ratio relating to the first transmission characteristic and the second transmission characteristic.

Another aspect of the present invention is a program of instructions for execution by the computer to perform a characteristic acquisition process of receiving patterns from an analog pattern generation device and a digital pattern acquisition device, and thereby acquiring a characteristic of the digital pattern acquisition device, wherein: [1] the analog pattern generation device converts an input digital pattern into an output analog pattern; and [2] the digital pattern acquisition device converts a first input analog pattern into a first output digital pattern, and converts a second input analog pattern into a second output digital pattern, the characteristic acquisition process including: a first transmission characteristic deriving step that derives a first transmission characteristic which converts the input digital pattern into the first output digital pattern where the first input analog pattern is the output analog pattern; a second transmission characteristic deriving step that derives a second transmission characteristic which converts the input digital pattern into the second output digital pattern where the second input analog pattern is the output analog pattern; and a transmission characteristic ratio deriving step that derives a transmission characteristic ratio which is a ratio relating to the first transmission characteristic and the second transmission characteristic.

Another aspect of the present invention is a program of instructions for execution by the computer to perform a characteristic acquisition process of receiving patterns from an analog pattern generation device and a digital pattern acquisition device, and thereby acquiring a delay characteristic in a transmission path from the analog pattern generation device to the digital pattern acquisition device, wherein: [1] the analog pattern generation device converts a first input digital pattern to a first output analog pattern, and converts a second input digital pattern into a second output analog pattern; and [2] the digital pattern acquisition device converts a first input analog pattern into a first output digital pattern, and converts a second input analog pattern into a second output digital pattern, the characteristic acquisition process including: a first straight transmission characteristic deriving step that derives a first straight transmission characteristic which converts the first input digital pattern into the first output digital pattern where the first input analog pattern is the first output analog pattern; a first cross transmission characteristic deriving step that derives a first cross transmission characteristic which converts the first input digital pattern into the second output digital pattern where the second input analog pattern is the first output analog pattern; a second straight transmission characteristic deriving step that derives a second straight transmission characteristic which converts the second input digital pattern into the second output digital pattern where the second input analog pattern is the second output analog pattern; a second cross transmission characteristic deriving step that derives a second cross transmission characteristic which converts the second input digital pattern into the first output digital pattern where the first input analog pattern is the second output analog pattern; and a delay characteristic deriving step that derives the delay characteristic based on the first straight transmission characteristic, the first cross transmission characteristic, the second straight transmission characteristic, and the second cross transmission characteristic.

BEST MODE FOR CARRYING OUT THE INVENTION

A description will now be given of embodiments of the present invention with reference to drawings.

Figure 1:
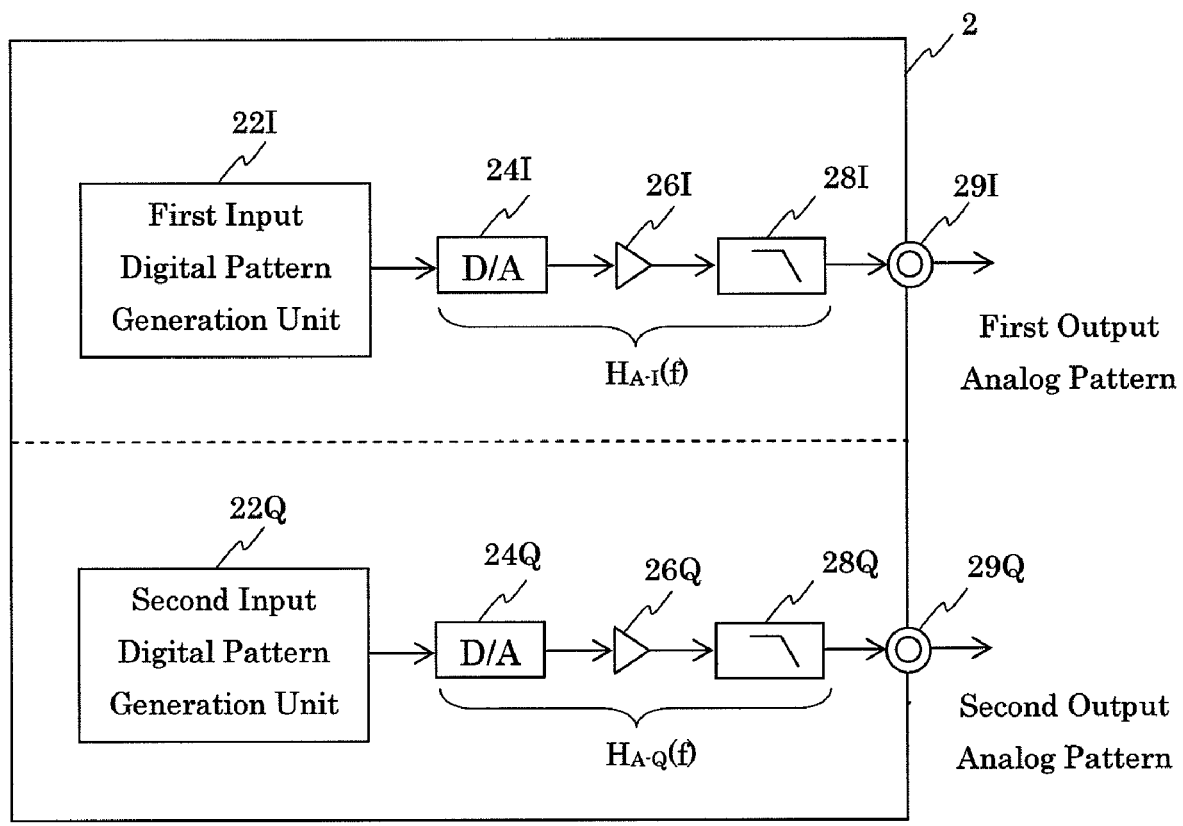
FIG. 1 is a block diagram showing a configuration of an arbitrary waveform generator (analog pattern generation device) 2 according to the embodiments of the present invention.

FIG. 1 is a block diagram showing a configuration of an arbitrary waveform generator (analog pattern generation device) 2 according to the embodiments of the present invention. The arbitrary waveform generator (AWG) 2 includes a first input digital pattern generation unit 22I, a first D/A converter 24I, a first output amplifier 26I, a first output filter 28I, a first output terminal 29I, a second input digital pattern generation unit 22Q, a second D/A converter 24Q, a second output amplifier 26Q, a second output filter 28Q and a second output terminal 29Q.

The first input digital pattern generation unit 22I generates a digital pattern (referred to as "first input digital pattern").

The first D/A converter 24I converts the first input digital pattern into an analog signal.

The first output amplifier 26I amplifies an output of the first D/A converter 24I.

The first output filter 28I applies a filtering process to an output of the first output amplifier 26I (for example, cuts a high frequency component and passes a low frequency component).

It should be noted that the first output amplifier 26I and the first output filter 28I are examples of circuits for applying analog processing to the output of the first D/A converter 24I, and may be replaced by any widely-known analog processing circuits.

The first output terminal 29I outputs an output of the first output filter 28I (referred to as "first output analog pattern").

On this occasion, a frequency characteristic of the first D/A converter 24I, the first output amplifier 26I and the first output filter 28I is represented by an S parameter as $H_{A-I}(f)$. It should be noted that "f" denotes the frequency, and an expression of "(f)" indicates a representation in the frequency domain. $H_{A-I}(f)$ is measured in advance and is recorded in the first input digital pattern generation unit 22I. $H_{A-I}(f)$ is a first generation-side transmission characteristic which converts the first input digital pattern into the first output analog pattern.

For example, a description will now be given of a case in which $H_{SI}(f)$ is to be obtained as the first output analog pattern. When $H_{SI}(f)$ is fed to the first input digital pattern generation unit 22I, the first input digital pattern generation unit 22I is configured to output $H_{SI}(f)/H_{A-I}(f)$ as the first input digital pattern. Then, the first output analog pattern will be $H_{SI}(f)/H_{A-I}(f) \times H_{A-I}(f) = H_{SI}(f)$. In this way, the first input digital pattern generation unit 22I has a correction function. It is optional whether to use the correction function of the first input digital pattern generation unit 22I ($H_{SI}(f)/H_{A-I}(f)$ is output) or not ($H_{SI}(f)$ is output).

The first input digital pattern generated by the first input digital pattern generation unit 22I is converted into the first output analog pattern by the first D/A converter 24I, the first output amplifier 26I and the first output filter 28I. The first output analog pattern is output from the first output terminal 29I.

The second input digital pattern generation unit 22Q generates a digital pattern (referred to as "second input digital pattern").

The second D/A converter 24Q converts the second input digital pattern into an analog signal.

The second output amplifier 26Q amplifies an output of the second D/A converter 24Q.

The second output filter 28Q applies a filtering process to an output of the second output amplifier 26Q (for example, cuts a high frequency component and passes a low frequency component).

It should be noted that the second output amplifier 26Q and the second output filter 28Q are examples of circuits for applying analog processing to the output of the second D/A converter 24Q, and may be replaced by any widely-known analog processing circuits.

The second output terminal 29Q outputs an output of the second output filter 28Q (referred to as "second output analog pattern").

On this occasion, a frequency characteristic of the second D/A converter 24Q, the second output amplifier 26Q and the second output filter 28Q is represented by an S parameter as $H_{A-Q}(f)$. $H_{A-Q}(f)$ is measured in advance and is recorded in the second input digital pattern generation unit 22Q. $H_{A-Q}(f)$ is a second generation-side transmission characteristic which converts the second input digital pattern into the second output analog pattern.

For example, a description will now be given of a case in which $H_{SQ}(f)$ is to be obtained as the second output analog pattern. When $H_{SQ}(f)$ is fed to the second input digital pattern generation unit 22Q, the second input digital pattern generation unit 22Q is configured to output $H_{SQ}(f)/H_{A-Q}(f)$ as the second input digital pattern. Then, the second output analog pattern will be $H_{SQ}(f)/H_{A-Q}(f) \times H_{A-Q}(f) = H_{SQ}(f)$. In this way, the second input digital pattern generation unit 22Q has a correction function. It is optional whether to use the correction function of the second input digital pattern generation unit 22Q ($H_{SQ}(f)/H_{A-Q}(f)$ is output) or not ($H_{SQ}(f)$ is output).

The second input digital pattern generated by the second input digital pattern generation unit 22Q is converted into the second output analog pattern by the second D/A converter 24Q, the second output amplifier 26Q and the second output filter 28Q. The second output analog pattern is output from the second output terminal 29Q.

Figure 2:
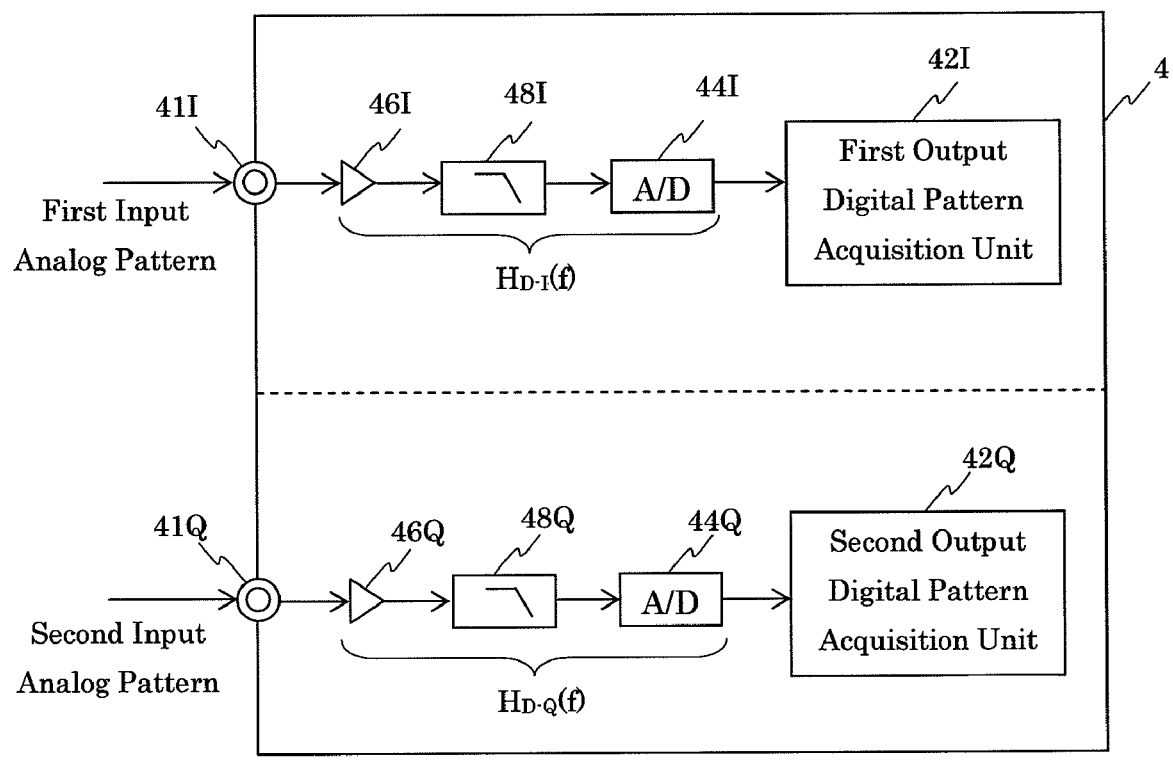
FIG. 2 is a block diagram showing a configuration of a digitizer (digital pattern acquisition device) 4 according to the embodiments of the present invention.

FIG. 2 is a block diagram showing a configuration of a digitizer (digital pattern acquisition device) 4 according to the embodiments of the present invention. The digitizer 4 includes a first input terminal 41I, a first output digital pattern acquisition unit 42I, a first A/D converter 44I, a first input amplifier 46I, a first input filter 48I, a second input terminal 41Q, a second output digital pattern acquisition unit 42Q, a second A/D converter 44Q, a second input amplifier 46Q and a second input filter 48Q.

The first input terminal 41I receives an input of an analog signal (referred to as "first input analog pattern").

The first input amplifier 46I amplifies the first input analog pattern.

The first input filter 48I applies a filtering process to an output of the first input amplifier 46I (for example, cuts a high frequency component and passes a low frequency component).

It should be noted that the first input amplifier 46I and the first input filter 48I are examples of circuits for applying analog processing to the first input analog pattern, and may be replaced by any widely-known analog processing circuits.

The first A/D converter 44I converts an output of the first input filter 48I into a digital signal (referred to as "first output digital pattern").

The first output digital pattern acquisition unit 42I acquires the first output digital pattern from the first A/D converter 44I.

A frequency characteristic of the first input amplifier 46I, the first input filter 48I and the first A/D converter 44I is represented by an S parameter as $H_{D-I}(f)$. $H_{D-I}(f)$ is measured in advance and is recorded in the first output digital pattern acquisition unit 42I. $H_{D-I}(f)$ is a first acquisition-side transmission characteristic which converts the first input analog pattern into the first output digital pattern.

For example, when the output of the first A/D converter 44I is $H_{DI}(f)$, the first output digital pattern acquisition unit 42I acquires $H_{DI}(f)/H_{D-I}(f)$ as the first output digital pattern. This is considered as a true value obtained by digitizing the first input analog pattern ($H_{DI}(f)/H_{D-I}(f) \times H_{D-I}(f) = H_{DI}(f)$). In this way, the first output digital pattern acquisition unit 42I has a correction function. It is optional whether to use the correction function of the first output digital pattern acquisition unit 42I ($H_{DI}(f)/H_{D-I}(f)$ is acquired) or not ($H_{DI}(f)$ is acquired).

The first input analog pattern received by the first input terminal 41I is converted into the first output digital pattern by the first input amplifier 46I, the first input filter 48I and the first A/D converter 44I.

The second input terminal 41Q receives an input of an analog signal (referred to as "second input analog pattern").

The second input amplifier 46Q amplifies the second input analog pattern.

The second input filter 48Q applies a filtering process to an output of the second input amplifier 46Q (for example, cuts a high frequency component and passes a low frequency component).

It should be noted that the second input amplifier 46Q and the second input filter 48Q are examples of circuits for applying analog processing to the second input analog pattern, and may be replaced by any widely-known analog processing circuits.

The second A/D converter 44Q converts an output of the second input filter 48Q into a digital signal (referred to as "second output digital pattern").

The second output digital pattern acquisition unit 42Q acquires the second output digital pattern from the second A/D converter 44Q.

A frequency characteristic of the second input amplifier 46Q, the second input filter 48Q and the second A/D converter 44Q is represented by an S parameter as $H_{D-Q}(f)$. $H_{D-Q}(f)$ is measured in advance and is recorded in the second output digital pattern acquisition unit 42Q. $H_{D-Q}(f)$ is a second acquisition-side transmission characteristic which converts the second input analog pattern into the second output digital pattern.

For example, when the output of the second A/D converter 44Q is $H_{DQ}(f)$, the second output digital pattern acquisition unit 42Q acquires $H_{DQ}(f)/H_{D-Q}(f)$ as the second output digital pattern. This is considered as a true value obtained by digitizing the second input analog pattern ($H_{DQ}(f)/H_{D-Q}(f) \times H_{D-Q}(f) = H_{DQ}(f)$). In this way, the second output digital pattern acquisition unit 42Q has a correction function. It is optional whether to use the correction function of the second output digital pattern acquisition unit 42Q ($H_{DQ}(f)/H_{D-Q}(f)$ is acquired) or not ($H_{DQ}(f)$ is acquired).

The second input analog pattern received by the second input terminal 41Q is converted into the second output digital pattern by the second input amplifier 46Q, the second input filter 48Q and the second A/D converter 44Q.

A characteristic acquisition device 1 differs depending on respective embodiments of the present invention. A description will now be given of the characteristic acquisition device 1.

First Embodiment

Figure 3:
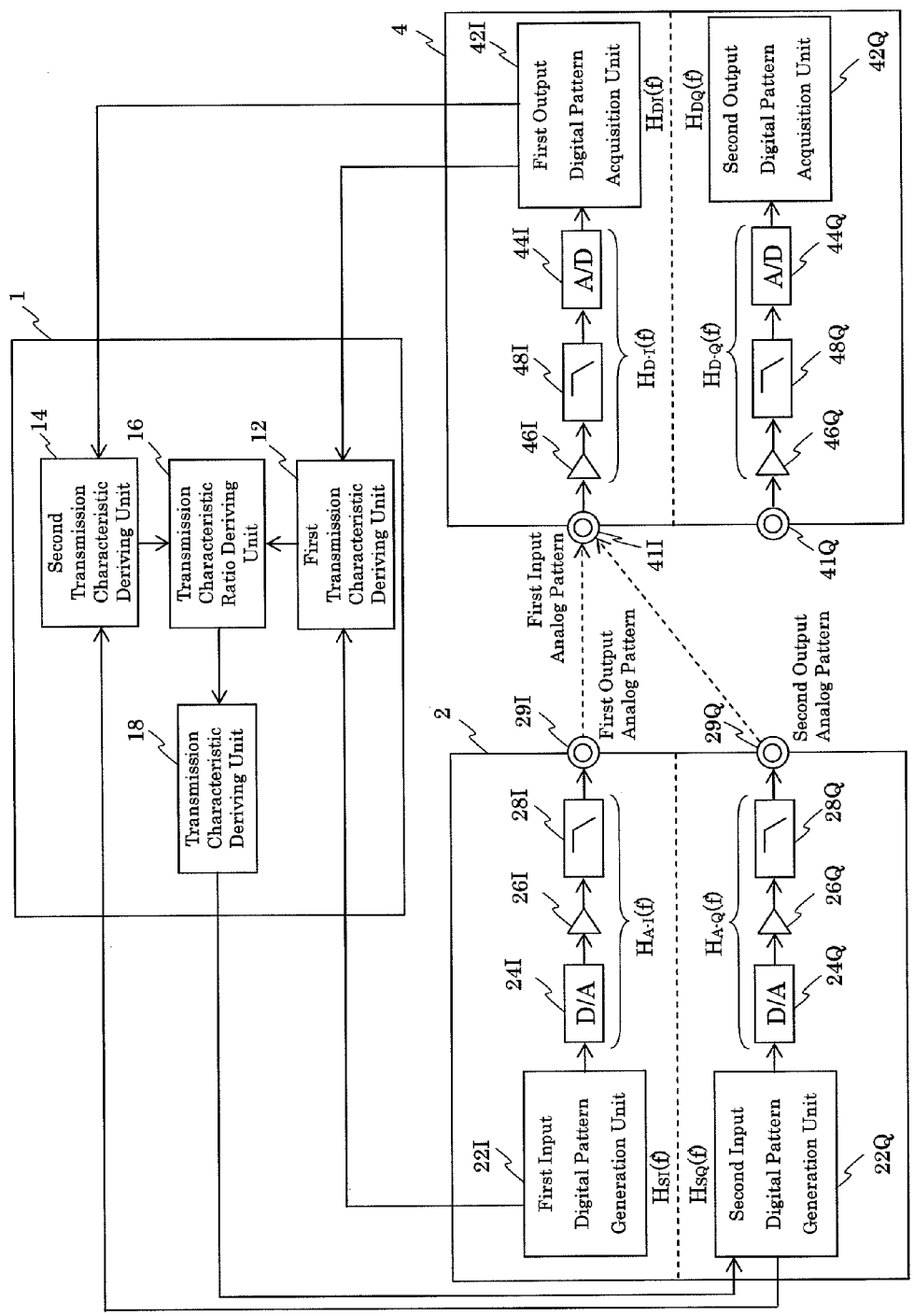
FIG. 3 is a block diagram showing a configuration of the characteristic acquisition device 1 according to a first embodiment.

FIG. 3 is a block diagram showing a configuration of the characteristic acquisition device 1 according to a first embodiment. The characteristic acquisition device 1 according to the first embodiment is connected to the arbitrary waveform generator (analog pattern generation device) 2 and the digitizer (digital pattern acquisition device) 4. Moreover, the characteristic acquisition device 1 acquires a characteristic of the arbitrary waveform generator 2.

The characteristic acquisition device 1 according to the first embodiment includes a first transmission characteristic deriving unit 12, a second transmission characteristic deriving unit 14, a transmission characteristic ratio deriving unit 16 and a transmission characteristic deriving unit 18.

The first transmission characteristic deriving unit 12 operates when the first output terminal 29I and the first input terminal 41I are connected with each other. The first transmission characteristic deriving unit 12 receives the first input digital pattern from the first input digital pattern generation unit 22I (operating without the correction function) of the arbitrary waveform generator 2. Moreover, the first transmission characteristic deriving unit 12 receives the first output digital pattern from the first output digital pattern acquisition unit 42I (operating without the correction function) of the digitizer 4. This first output digital pattern is considered as a signal when the first input analog pattern (refer to FIG. 2) is the first output analog pattern (refer to FIG. 1). The first transmission characteristic deriving unit 12 derives a first transmission characteristic which converts the first input digital pattern into the first output digital pattern.

The second transmission characteristic deriving unit 14 operates when the second output terminal 29Q and the first input terminal 41I are connected with each other. The second transmission characteristic deriving unit 14 receives the second input digital pattern from the second input digital pattern generation unit 22Q (operating without the correction function) of the arbitrary waveform generator 2. Moreover, the second transmission characteristic deriving unit 14 receives the first output digital pattern from the first output digital pattern acquisition unit 42I (operating without the correction function) of the digitizer 4. This first output digital pattern is considered as a signal when the first input analog pattern (refer to FIG. 2) is the second output analog pattern (refer to FIG. 1). The second transmission characteristic deriving unit 14 derives a second transmission characteristic which converts the second input digital pattern into the first output digital pattern.

The transmission characteristic ratio deriving unit 16 receives the first transmission characteristic from the first transmission characteristic deriving unit 12, and receives the second transmission characteristic from the second transmission characteristic deriving unit 14. Moreover, the transmission characteristic ratio deriving unit 16 derives a transmission characteristic ratio which is a ratio relating to the first transmission characteristic and the second transmission characteristic. The transmission characteristic ratio can be considered as a characteristic of the arbitrary waveform generator 2.

The transmission characteristic deriving unit 18 derives the second generation-side transmission characteristic $H_{A-Q}(f)$ by multiplying the first generation-side transmission characteristic $H_{A-I}(f)$ by the transmission characteristic ratio derived by the transmission characteristic ratio deriving unit 16. The second generation-side transmission characteristic $H_{A-Q}(f)$ is fed to the second input digital pattern generation unit 22Q and is used when the correction function of the second input digital pattern generation unit 22Q is used.

A description will now be given of an operation of the first embodiment.

First, the first output terminal 29I and the first input terminal 41I are connected with each other.

Figure 4:
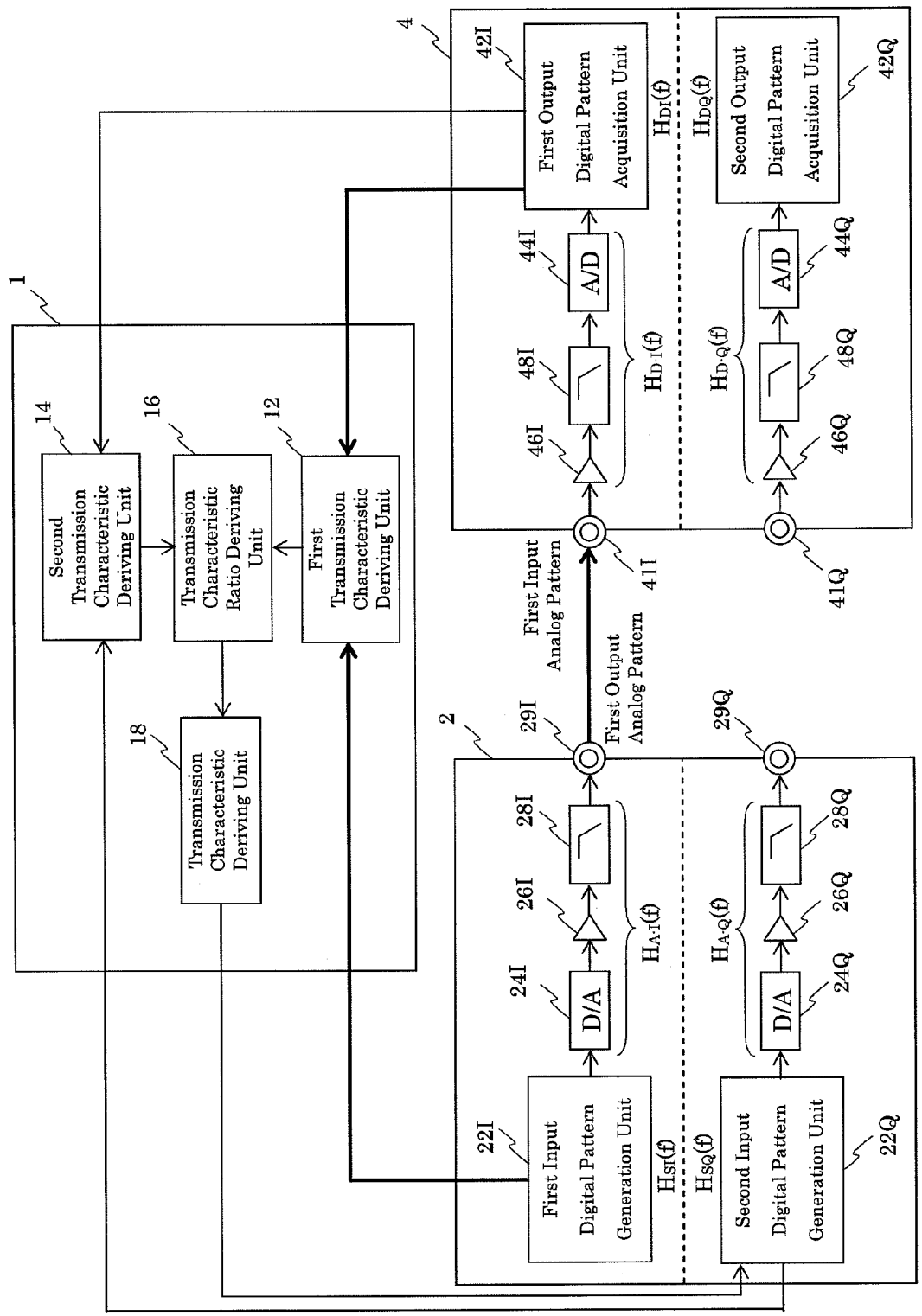
FIG. 4 illustrates an operation of the characteristic acquisition device 1 according to the first embodiment when the first output terminal 29I and the first input terminal 41I are connected with each other.

FIG. 4 illustrates an operation of the characteristic acquisition device 1 according to the first embodiment when the first output terminal 29I and the first input terminal 41I are connected with each other.

The first input digital pattern generation unit 22I of the arbitrary waveform generator 2 outputs the first input digital pattern $H_{SI}(f)$. Since the correction function of the first input digital pattern generation unit 22I is not used, $H_{SI}(f)/H_{A-I}(f)$ is not to be output.

The first input digital pattern $H_{SI}(f)$ is converted into the first output analog pattern by the first D/A converter 24I, the first output amplifier 26I and the first output filter 28I. The first output analog pattern is represented by $H_{SI}(f) \times H_{A-I}(f)$.

The first output analog pattern is output from the first output terminal 29I, and is input as the first input analog pattern to the first input terminal 41I of the digitizer 4.

The first input analog pattern is converted into the first output digital pattern by the first input amplifier 46I, the first input filter 48I and the first A/D converter 44I. The first output digital pattern $H_{DI}(f)$ is represented by $H_{SI}(f) \times H_{A-I}(f) \times H_{D-I}(f)$. The first output digital pattern acquisition unit 42I acquires the first output digital pattern $H_{SI}(f) \times H_{A-I}(f) \times H_{D-I}(f)$. Since the correction function of the first output digital pattern acquisition unit 42I is not used, the first output digital pattern acquisition unit 42I does not divide the output of the first A/D converter 44I by $H_{D-I}(f)$.

The first transmission characteristic deriving unit 12 receives the first input digital pattern $H_{SI}(f)$ from the first input digital pattern generation unit 22I, and receives the first output digital pattern $H_{DI}(f)$ ($=H_{SI}(f) \times H_{A-I}(f) \times H_{D-I}(f)$) from the first output digital pattern acquisition unit 42I. Moreover, the first transmission characteristic deriving unit 12 derives the first transmission characteristic which converts the first input digital pattern $H_{SI}(f)$ into the first output digital pattern $H_{DI}(f)$. In particular, the first transmission characteristic deriving unit 12 divides the first output digital pattern $H_{DI}(f)$ by the first input digital pattern $H_{SI}(f)$. Thus, the first transmission characteristic $H_{II}(f)$ is given by $H_{DI}(f)/H_{SI}(f) = H_{A-I}(f) \times H_{D-I}(f)$.

Then, the second output terminal 29Q and the first input terminal 41I are connected with each other.

Figure 5:
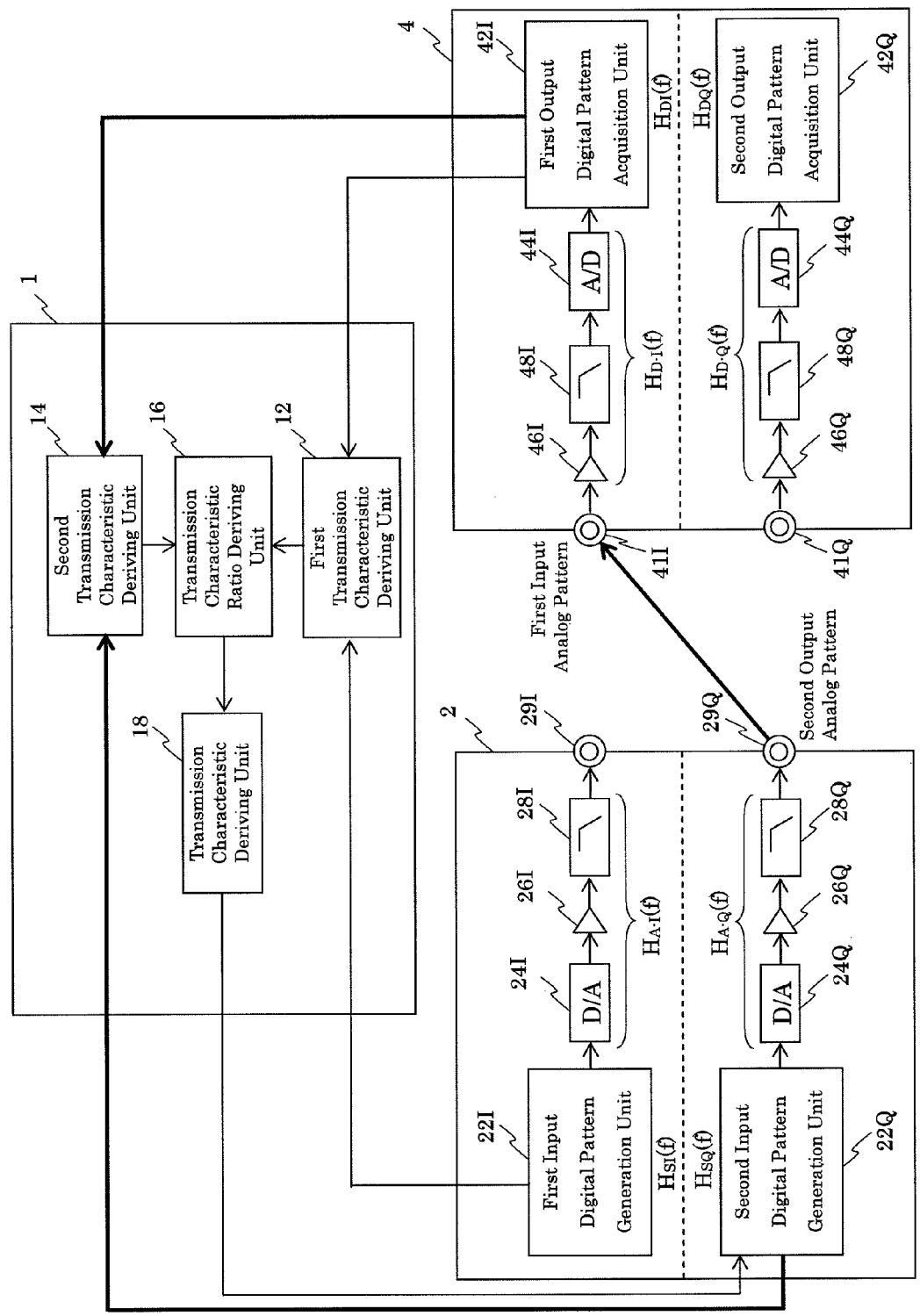
FIG. 5 illustrates an operation of the characteristic acquisition device 1 according to the first embodiment when the second output terminal 29Q and the first input terminal 41I are connected with each other.

FIG. 5 illustrates an operation of the characteristic acquisition device 1 according to the first embodiment when the second output terminal 29Q and the first input terminal 41I are connected with each other.

The second input digital pattern generation unit 22Q of the arbitrary waveform generator 2 outputs the second input digital pattern $H_{SQ}(f)$. Since the correction function of the second input digital pattern generation unit 22Q is not used, $H_{SQ}(f)/H_{A-Q}(f)$ is not to be output.

The second input digital pattern $H_{SQ}(f)$ is converted into the second output analog pattern by the second D/A converter 24Q, the second output amplifier 26Q and the second output filter 28Q. The second output analog pattern is represented by $H_{SQ}(f) \times H_{A-Q}(f)$.

The second output analog pattern is output from the second output terminal 29Q, and is input as the first input analog pattern to the first input terminal 41I of the digitizer 4.

The first input analog pattern is converted into the first output digital pattern by the first input amplifier 46I, the first input filter 48I and the first A/D converter 44I. The first output digital pattern $H_{DI}(f)$ is represented by $H_{SQ}(f) \times H_{A-Q}(f) \times H_{D-I}(f)$. The first output digital pattern acquisition unit 42I acquires the first output digital pattern $H_{SQ}(f) \times H_{A-Q}(f) \times H_{D-I}(f)$. Since the correction function of the first output digital pattern acquisition unit 42I is not used, the first output digital pattern acquisition unit 42I does not divide the output of the first A/D converter 44I by $H_{D-I}(f)$.

The second transmission characteristic deriving unit 14 receives the second input digital pattern $H_{SQ}(f)$ from the second input digital pattern generation unit 22Q, and receives the first output digital pattern $H_{DI}(f)$ ($=H_{SQ}(f) \times H_{A-Q}(f) \times H_{D-I}(f)$) from the first output digital pattern acquisition unit 42I. Moreover, the second transmission characteristic deriving unit 14 derives the second transmission characteristic which converts the second input digital pattern $H_{SQ}(f)$ into the first output digital pattern $H_{DI}(f)$. In particular, the second transmission characteristic deriving unit 14 divides the first output digital pattern $H_{DI}(f)$ by the second input digital pattern $H_{SQ}(f)$. Thus, the second transmission characteristic $H_{QI}(f)$ is given by $H_{QI}(f)=H_{DI}(f)/H_{SQ}(f)=H_{A-Q}(f) \times H_{D-I}(f)$.

The transmission characteristic ratio deriving unit 16 receives the first transmission characteristic $H_{II}(f)$ from the first transmission characteristic deriving unit 12, and receives the second transmission characteristic $H_{QI}(f)$ from the second transmission characteristic deriving unit 14. Moreover, the transmission characteristic ratio deriving unit 16 derives the transmission characteristic ratio $H_{QI}(f)/H_{II}(f)$ which is the ratio relating to the first transmission characteristic and the second transmission characteristic. Since the second transmission characteristic is represented by $H_{QI}(f)=H_{A-Q}(f) \times H_{D-I}(f)$ and the first transmission characteristic is represented by $H_{II}(f)=H_{A-I}(f) \times H_{D-I}(f)$, the transmission characteristic ratio is given by $H_{A-Q}(f)/H_{A-I}(f)$.

The transmission characteristic deriving unit 18 receives the transmission characteristic ratio from the transmission characteristic ratio deriving unit 16. Moreover, the transmission characteristic deriving unit 18 records the first generation-side transmission characteristic $H_{A-I}(f)$. Further, the transmission characteristic deriving unit 18 derives the second generation-side transmission characteristic $H_{A-Q}(f)$ by multiplying the first generation-side transmission characteristic $H_{A-I}(f)$ by the transmission characteristic ratio $H_{A-Q}(f)/H_{A-I}(f)$ derived by the transmission characteristic ratio deriving unit 16. The second generation-side transmission characteristic $H_{A-Q}(f)$ is fed to the second input digital pattern generation unit 22Q.

Then, the arbitrary waveform generator 2 is disconnected from the characteristic acquisition device 1 and the digitizer 4, and is used for generating the first output analog pattern and the second output analog pattern. On this occasion, the correction function of the first input digital pattern generation unit 22I and the correction function of the second input digital pattern generation unit 22Q are used.

According to the first embodiment, it is possible to reduce errors (such as a skew) generated between the multiple D/A conversion paths (between the path routing through the first D/A converter 24I, the first output amplifier 26I and the first output filter 28I and the path routing through the second D/A converter 24Q, the second output amplifier 26Q and the second output filter 28Q) in the arbitrary waveform generator 2.

This advantage is readily understood by a comparison between a first comparative example, in which a value measured in advance is used as the second generation-side transmission characteristic $H_{A-Q}(f)$, and the first embodiment.

As in the first comparative example, when values measured in advance are used as the first generation-side transmission characteristic $H_{A-I}(f)$ and the second generation-side transmission characteristic $H_{A-Q}(f)$, the first generation-side transmission characteristic $H_{A-I}(f)$ and the second generation-side transmission characteristic $H_{A-Q}(f)$ inevitably contain measurement errors.

For example, it is assumed that the measured first generation-side transmission characteristic $H_{A-I}(f)$ is larger than a true value, and the measured second generation-side transmission characteristic $H_{A-Q}(f)$ is smaller than a true value. In this case, if the correction function is used so that the first output analog pattern and the second output analog pattern have the same level, the first output analog pattern is smaller and the second output analog pattern is larger.

However, if, as in the first embodiment, the second generation-side transmission characteristic $H_{A-Q}(f)$ is derived based on the transmission characteristic ratio, though the measured first generation-side transmission characteristic $H_{A-I}(f)$ contains a measurement error (larger than the true value, for example), the derived second generation-side transmission characteristic $H_{A-Q}(f)$ also contains an error as large as the first generation-side transmission characteristic $H_{A-I}(f)$ (larger than the true value, for example). Thus, in a case where the correction function is used such that the first output analog pattern and the second output analog pattern have the same level, if the measured first generation-side transmission characteristic $H_{A-I}(f)$ is larger than the true value, the first output analog pattern and the second output analog pattern are smaller than expected values. However, the first output analog pattern and the second output analog pattern can be the same level.

Second Embodiment

Figure 6:
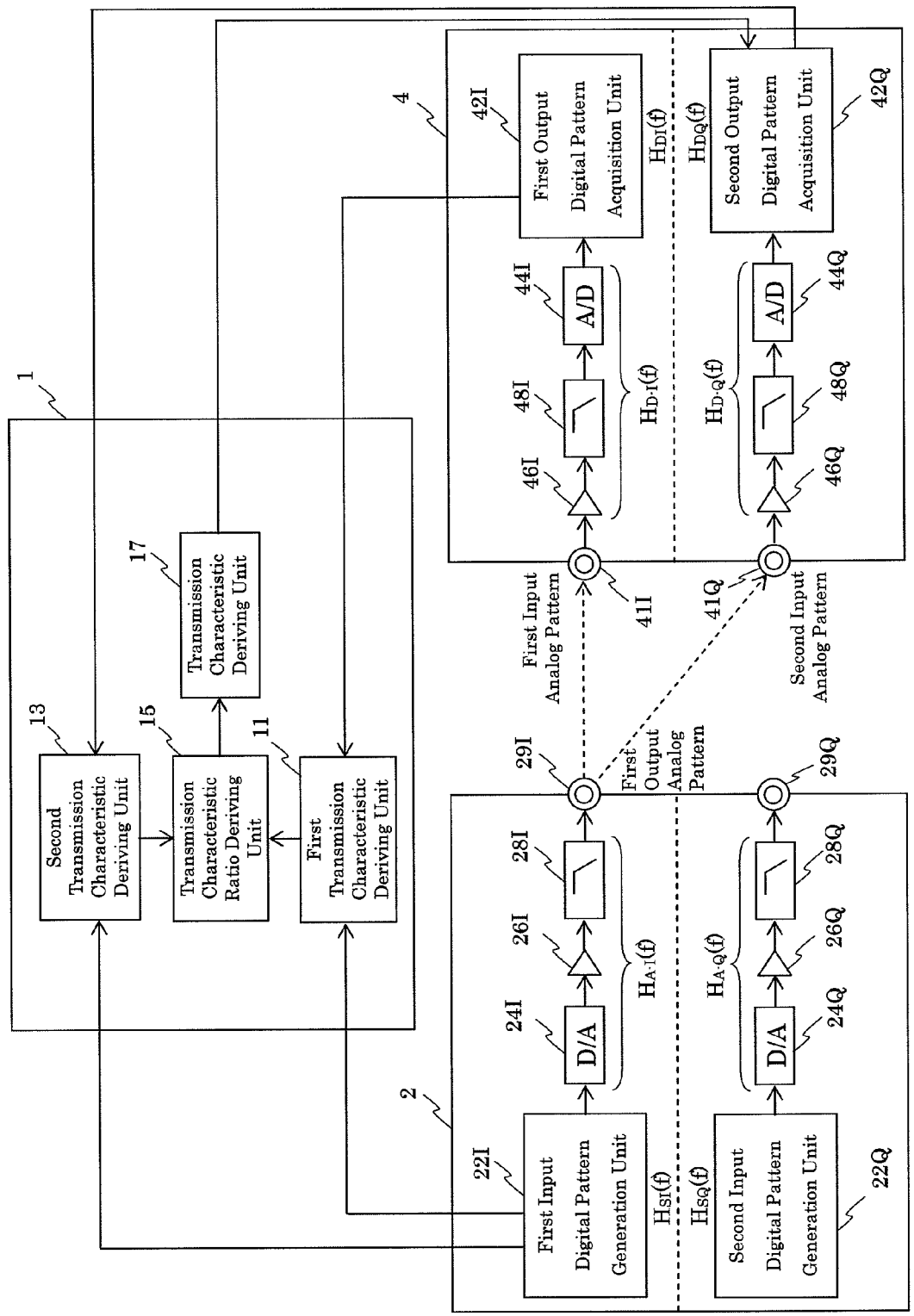
FIG. 6 is a block diagram showing a configuration of the characteristic acquisition device 1 according a second embodiment

FIG. 6 is a block diagram showing a configuration of the characteristic acquisition device 1 according a second embodiment. The characteristic acquisition device 1 according to the second embodiment is connected to the arbitrary waveform generator (analog pattern generation device) 2 and the digitizer (digital pattern acquisition device) 4. Moreover, the characteristic acquisition device 1 acquires a characteristic of the digitizer 4.

The characteristic acquisition device 1 according to the second embodiment includes a first transmission characteristic deriving unit 11, a second transmission characteristic deriving unit 13, a transmission characteristic ratio deriving unit 15 and a transmission characteristic deriving unit 17.

The first transmission characteristic deriving unit 11 operates when the first output terminal 29I and the first input terminal 41I are connected with each other. The first transmission characteristic deriving unit 11 receives the first input digital pattern from the first input digital pattern generation unit 22I (operating without the correction function) of the arbitrary waveform generator 2. Moreover, the first transmission characteristic deriving unit 11 receives the first output digital pattern from the first output digital pattern acquisition unit 42I (operating without the correction function) of the digitizer 4. This first output digital pattern is considered as a signal when the first input analog pattern (refer to FIG. 2) is the first output analog pattern (refer to FIG. 1). The first transmission characteristic deriving unit 11 derives a first transmission characteristic which converts the first input digital pattern into the first output digital pattern.

The second transmission characteristic deriving unit 13 operates when the first output terminal 29I and the second input terminal 41Q are connected with each other. The second transmission characteristic deriving unit 13 receives the first input digital pattern from the first input digital pattern generation unit 22I (operating without the correction function) of the arbitrary waveform generator 2. Moreover, the second transmission characteristic deriving unit 13 receives the second output digital pattern from the second output digital pattern acquisition unit 42Q (operating without the correction function) of the digitizer 4. This second output digital pattern is considered as a signal when the second input analog pattern (refer to FIG. 2) is the first output analog pattern (refer to FIG. 1). The second transmission characteristic deriving unit 13 derives a second transmission characteristic which converts the first input digital pattern into the second output digital pattern.

The transmission characteristic ratio deriving unit 15 receives the first transmission characteristic from the first transmission characteristic deriving unit 11, and receives the second transmission characteristic from the second transmission characteristic deriving unit 13. Moreover, the transmission characteristic ratio deriving unit 15 derives a transmission characteristic ratio which is a ratio relating to the first transmission characteristic and the second transmission characteristic. The transmission characteristic ratio can be considered as a characteristic of the digitizer 4.

The transmission characteristic deriving unit 17 derives the second acquisition-side transmission characteristic $H_{D-Q}(f)$ by multiplying the first acquisition-side transmission characteristic $H_{D-I}(f)$ by the transmission characteristic ratio derived by the transmission characteristic ratio deriving unit 15. The second acquisition-side transmission characteristic $H_{D-Q}(f)$ is fed to the second output digital pattern acquisition unit 42Q and is used when the correction function of the second output digital pattern acquisition unit 42Q is used.

A description will now be given of an operation of the second embodiment.

First, the first output terminal 29I and the first input terminal 41I are connected with each other.

Figure 7:
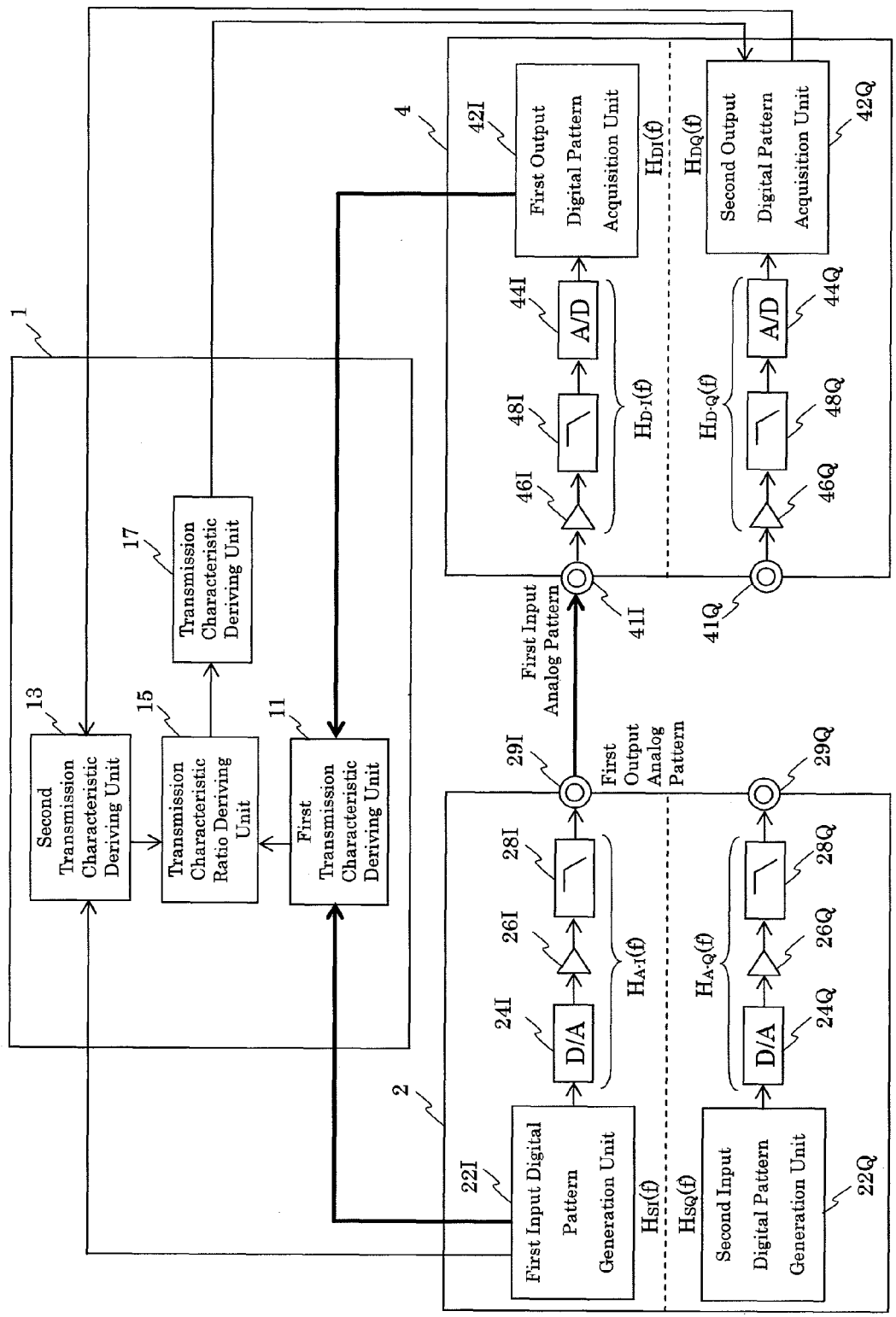
FIG. 7 illustrates an operation of the characteristic acquisition device 1 according to the second embodiment when the first output terminal 29I and the first input terminal 41I are connected with each other.

FIG. 7 illustrates an operation of the characteristic acquisition device 1 according to the second embodiment when the first output terminal 29I and the first input terminal 41I are connected with each other.

The first input digital pattern generation unit 22I of the arbitrary waveform generator 2 outputs the first input digital pattern $H_{SI}(f)$. Since the correction function of the first input digital pattern generation unit 22I is not used, $H_{SI}(f)/H_{A-I}(f)$ is not to be output.

The first input digital pattern $H_{SI}(f)$ is converted into the first output analog pattern by the first D/A converter 24I, the first output amplifier 26I and the first output filter 28I. The first output analog pattern is represented by $H_{SI}(f) \times H_{A-I}(f)$.

The first output analog pattern is output from the first output terminal 29I, and is input as the first input analog pattern to the first input terminal 41I of the digitizer 4.

The first input analog pattern is converted into the first output digital pattern by the first input amplifier 46I, the first input filter 48I and the first A/D converter 44I. The first output digital pattern $H_{DI}(f)$ is represented by $H_{SI}(f) \times H_{A-I}(f) \times H_{D-I}(f)$. The first output digital pattern acquisition unit 42I acquires the first output digital pattern $H_{SI}(f) \times H_{A-I}(f) \times H_{D-I}(f)$. Since the correction function of the first output digital pattern acquisition unit 42I is not used, the first output digital pattern acquisition unit 42I does not divide the output of the first A/D converter 44I by $H_{D-I}(f)$.

The first transmission characteristic deriving unit 11 receives the first input digital pattern $H_{SI}(f)$ from the first input digital pattern generation unit 22I, and receives the first output digital pattern $H_{DI}(f)$ (=$H_{SI}(f) \times H_{A-I}(f) \times H_{D-I}(f)$) from the first output digital pattern acquisition unit 42I. Moreover, the first transmission characteristic deriving unit 12 derives the first transmission characteristic which converts the first input digital pattern $H_{SI}(f)$ into the first output digital pattern $H_{DI}(f)$. In particular, the first transmission characteristic deriving unit 12 divides the first output digital pattern $H_{DI}(f)$ by the first input digital pattern $H_{SI}(f)$. Thus, the first transmission characteristic $H_{II}(f)$ is given by $H_{II}(f)=H_{DI}(f)/H_{SI}(f)=H_{A-I}(f) \times H_{D-I}(f)$.

Then, the first output terminal 29I and the second input terminal 41Q are connected with each other.

Figure 8:
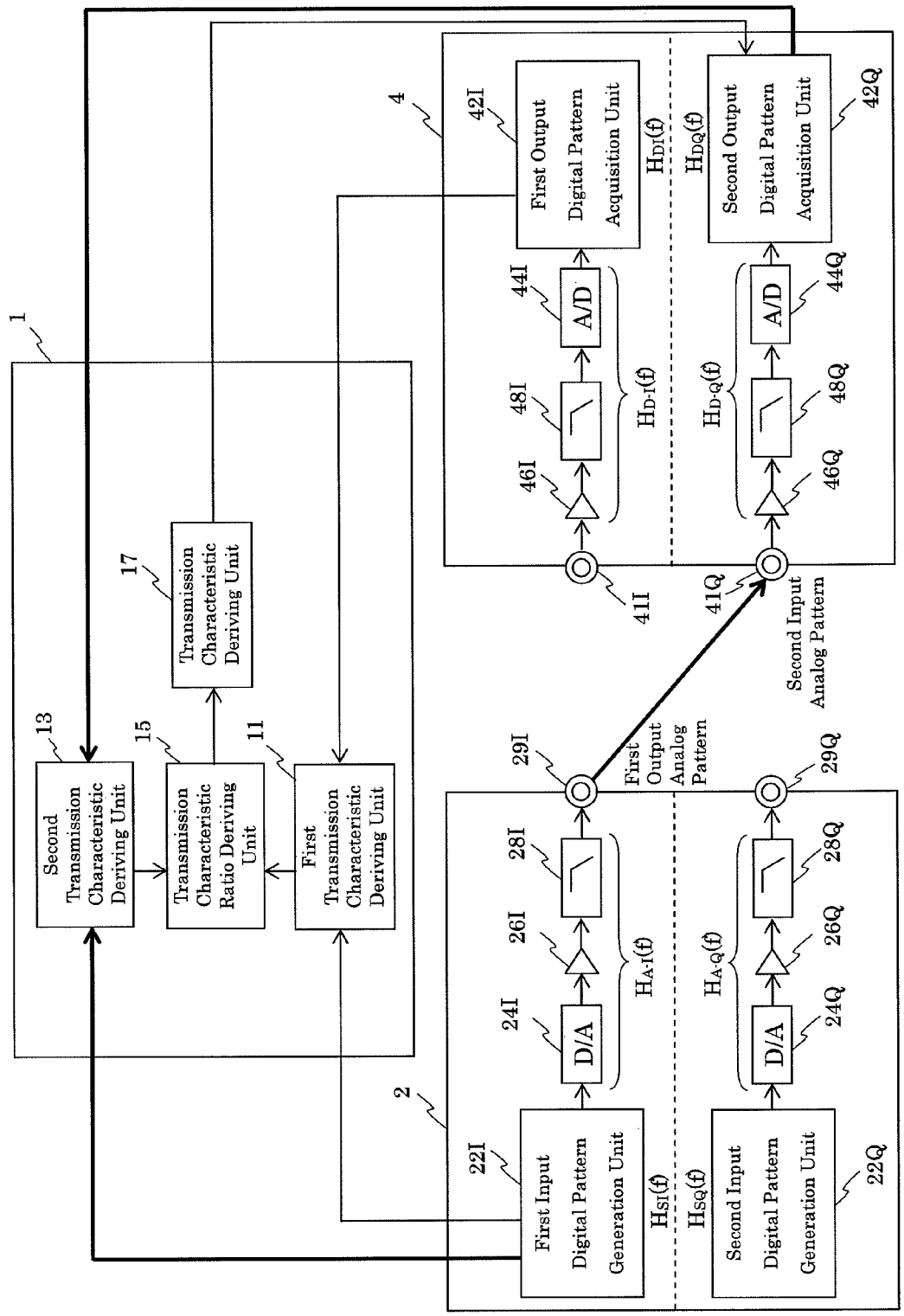
FIG. 8 illustrates an operation of the characteristic acquisition device 1 according to the second embodiment when the first output terminal 29I and the second input terminal 41Q are connected with each other.

FIG. 8 illustrates an operation of the characteristic acquisition device 1 according to the second embodiment when the first output terminal 29I and the second input terminal 41Q are connected with each other.

The first input digital pattern generation unit 22I of the arbitrary waveform generator 2 outputs the first input digital pattern $H_{SI}(f)$. Since the correction function of the first input digital pattern generation unit 22I is not used, $H_{SI}(f)/H_{A-I}(f)$ is not to be output.

The first input digital pattern $H_{SI}(f)$ is converted into the first output analog pattern by the first D/A converter 24I, the first output amplifier 26I and the first output filter 28I. The first output analog pattern is represented by $H_{SI}(f) \times H_{A-I}(f)$.

The first output analog pattern is output from the first output terminal 29I, and is input as the second input analog pattern to the second input terminal 41Q of the digitizer 4.

The second input analog pattern is converted into the second output digital pattern by the second input amplifier 46Q, the second input filter 48Q and the second A/D converter 44Q. The second output digital pattern $H_{DQ}(f)$ is represented by $H_{SI}(f) \times H_{A-I}(f) \times H_{D-Q}(f)$. The second output digital pattern acquisition unit 42Q acquires the second output digital pattern $H_{SI}(f) \times H_{A-I}(f) \times H_{D-Q}(f)$. Since the correction function of the second output digital pattern acquisition unit 42Q is not used, the second output digital pattern acquisition unit 42Q does not divide the output of the second A/D converter 44Q by $H_{D-Q}(f)$.

The second transmission characteristic deriving unit 13 receives the first input digital pattern $H_{SI}(f)$ from the first input digital pattern generation unit 22I, and receives the second output digital pattern $H_{DQ}(f)$ (=$H_{SI}(f) \times H_{A-I}(f) \times H_{D-Q}(f)$) from the second output digital pattern acquisition unit 42Q. Moreover, the second transmission characteristic deriving unit 13 derives the second transmission characteristic which converts the first input digital pattern $H_{SI}(f)$ into the second output digital pattern $H_{DQ}(f)$. In particular, the second transmission characteristic deriving unit 13 divides the second output digital pattern $H_{DQ}(f)$ by the first input digital pattern $H_{SI}(f)$. Thus, the second transmission characteristic $H_{IQ}(f)$ is given by $H_{IQ}(f)=H_{DQ}(f)/H_{SI}(f)=H_{A-I}(f) \times H_{D-Q}(f)$.

The transmission characteristic ratio deriving unit 15 receives the first transmission characteristic $H_{II}(f)$ from the first transmission characteristic deriving unit 11, and receives the second transmission characteristic $H_{IQ}(f)$ from the second transmission characteristic deriving unit 13. Moreover, the transmission characteristic ratio deriving unit 15 derives the transmission characteristic ratio $H_{IQ}(f)/H_{II}(f)$ which is the ratio relating to the first transmission characteristic and the second transmission characteristic. Since the second transmission characteristic is represented by $H_{IQ}(f)=H_{A-I}(f) \times H_{D-Q}(f)$ and the first transmission characteristic is represented by $H_{II}(f)=H_{A-I}(f) \times H_{D-I}(f)$, the transmission characteristic ratio is given by $H_{D-Q}(f)/H_{D-I}(f)$.

The transmission characteristic deriving unit 17 receives the transmission characteristic ratio from the transmission characteristic ratio deriving unit 15. Moreover, the transmission characteristic deriving unit 17 records the first acquisition-side transmission characteristic $H_{D-I}(f)$. Further, the transmission characteristic deriving unit 17 derives the second acquisition-side transmission characteristic $H_{D-Q}(f)$ by multiplying the first acquisition-side transmission characteristic $H_{D-I}(f)$ by the transmission characteristic ratio $H_{D-Q}(f)/H_{D-I}(f)$ derived by the transmission characteristic ratio deriving unit 15. The second acquisition-side transmission characteristic $H_{D-Q}(f)$ is fed to the second output digital pattern generation unit 42Q.

Then, the digitizer 4 is disconnected from the characteristic acquisition device 1 and the arbitrary waveform generator 2, and is used for acquiring the first output digital pattern and the second output digital pattern from the first input analog pattern and the second input analog pattern. On this occasion, the correction function of the first output digital pattern acquisition unit 42I and the correction function of the second output digital pattern acquisition unit 42Q are used.

According to the second embodiment, it is possible to reduce errors (such as a skew) generated between the multiple A/D conversion paths (between the path routing through the first input amplifier 46I, the first input filter 48I and the first A/D converter 44I and the path routing through the second input amplifier 46Q, the second input filter 48Q and the second A/D converter 44Q) in the digitizer 4.

This advantage is readily understood by a comparison between a second comparative example, in which a value measured in advance is used as the second acquisition-side transmission characteristic $H_{D-Q}(f)$, and the second embodiment.

As in the second comparative example, when values measured in advance are used as the first acquisition-side transmission characteristic $H_{D-I}(f)$ and the second acquisition-side transmission characteristic $H_{D-Q}(f)$, the first acquisition-side transmission characteristic $H_{D-I}(f)$ and the second acquisition-side transmission characteristic $H_{D-Q}(f)$ inevitably contain measurement errors.

For example, it is assumed that the measured first acquisition-side transmission characteristic $H_{D-I}(f)$ is larger than a true value, and the measured second acquisition-side transmission characteristic $H_{D-Q}(f)$ is smaller than a true value. In this case, it is assumed that the correction function is used so that the first output digital pattern and the second output digital pattern at the same level are to be acquired from the first input analog pattern and the second input analog pattern at the same level. Then, the first output digital pattern is smaller and the second output digital pattern is larger.

However, if, as in the second embodiment, the second acquisition-side transmission characteristic $H_{D-Q}(f)$ is derived based on the transmission characteristic ratio, though the measured first acquisition-side transmission characteristic $H_{D-I}(f)$ contains a measurement error (larger than the true value, for example), the derived second acquisition-side transmission characteristic $H_{D-Q}(f)$ also contains an error as large as the first acquisition-side transmission characteristic $H_{D-I}(f)$ (larger than the true value, for example). Thus, in a case where the correction function is used such that the first output digital pattern and the second output digital pattern have the same level (in this case, however, the first input analog pattern and the second input analog pattern have the same level), if the measured first acquisition-side transmission characteristic $H_{D-I}(f)$ is larger than the true value, the first output digital pattern and the second output digital pattern are smaller than expected values. However, the first output digital pattern and the second output digital pattern can be the same level.

Third Embodiment

Figure 9:
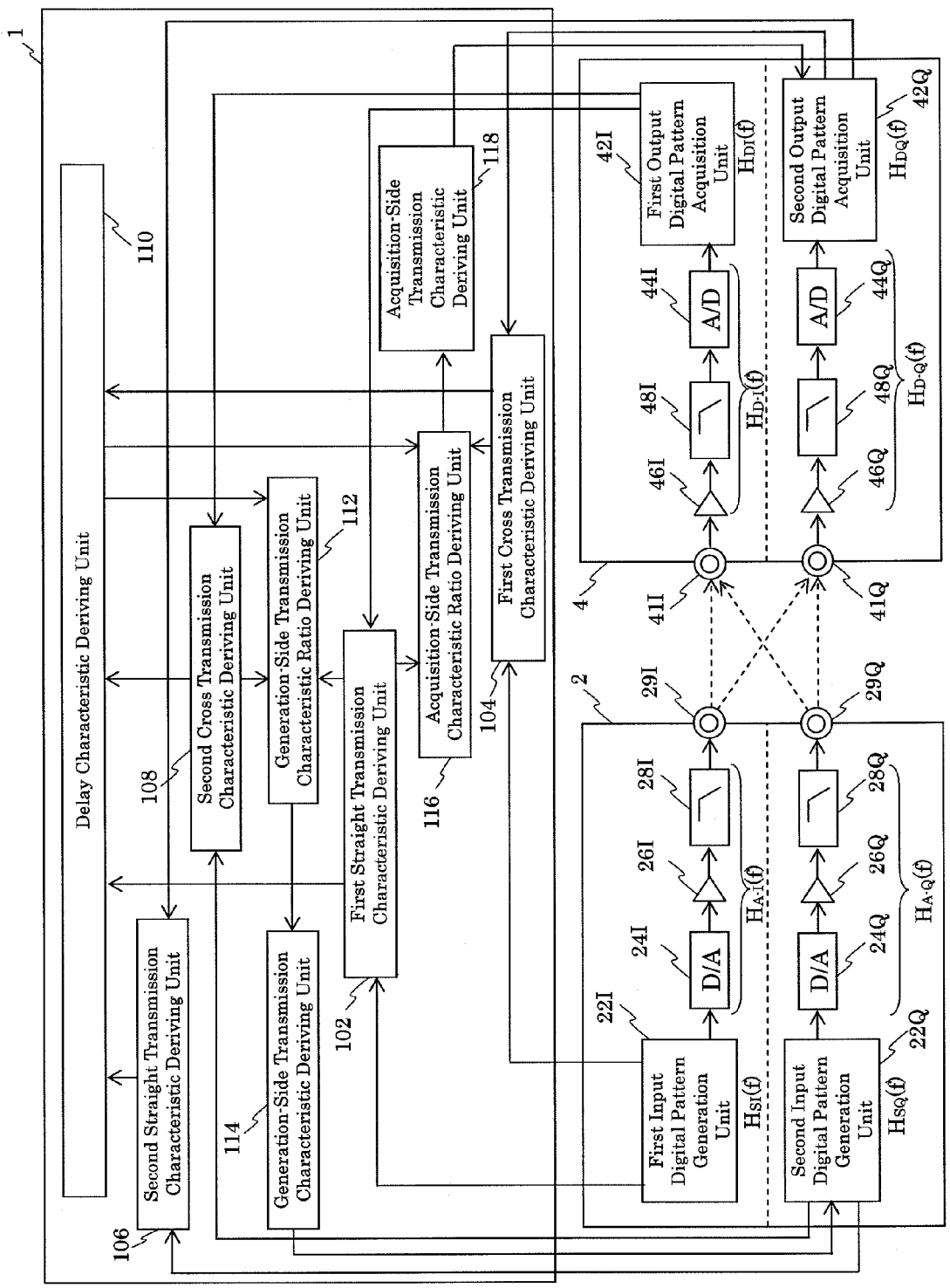
FIG. 9 is a block diagram showing a configuration of the characteristic acquisition device 1 according to a third embodiment.

FIG. 9 is a block diagram showing a configuration of the characteristic acquisition device 1 according to a third embodiment. The characteristic acquisition device 1 according to the third embodiment is connected to the arbitrary waveform generator (analog pattern generation device) 2 and the digitizer (digital pattern acquisition device) 4. Further, the characteristic acquisition device 1 acquires a delay characteristic on the transmission paths from the arbitrary waveform generator 2 to the digitizer 4.

The characteristic acquisition device 1 according to the third embodiment includes a first straight transmission characteristic deriving unit 102, a first cross transmission characteristic deriving unit 104, a second straight transmission characteristic deriving unit 106, a second cross transmission characteristic deriving unit 108, a delay characteristic deriving unit 110, a generation-side transmission characteristic ratio deriving unit 112, a generation-side transmission characteristic deriving unit 114, an acquisition-side transmission characteristic ratio deriving unit 116 and an acquisition-side transmission characteristic deriving unit 118.

The first straight transmission characteristic deriving unit 102 operates when the first output terminal 29I and the first input terminal 41I are connected with each other. The first straight transmission characteristic deriving unit 102 receives the first input digital pattern from the first input digital pattern generation unit 22I (operating without the correction function) of the arbitrary waveform generator 2. Moreover, the first straight transmission characteristic deriving unit 102 receives the first output digital pattern from the first output digital pattern acquisition unit 42I (operating without the correction function) of the digitizer 4. This first output digital pattern is considered as a signal when the first input analog pattern (FIG. 2) is the first output analog pattern (refer to FIG. 1). The first straight transmission characteristic deriving unit 102 derives a first straight transmission characteristic which converts the first input digital pattern into the first output digital pattern.

The first cross transmission characteristic deriving unit 104 operates when the first output terminal 29I and the second input terminal 41Q are connected with each other. The first cross transmission characteristic deriving unit 104 receives the first input digital pattern from the first input digital pattern generation unit 22I (operating without the correction function) of the arbitrary waveform generator 2. Moreover, the first cross transmission characteristic deriving unit 104 receives the second output digital pattern from the second output digital pattern acquisition unit 42Q (operating without the correction function) of the digitizer 4. This second output digital pattern is considered as a signal when the second input analog pattern (refer to FIG. 2) is the first output analog pattern (refer to FIG. 1). The first cross transmission characteristic deriving unit 104 derives a first cross transmission characteristic which converts the first input digital pattern into the second output digital pattern.

The second straight transmission characteristic deriving unit 106 operates when the second output terminal 29Q and the second input terminal 41Q are connected with each other. The second straight transmission characteristic deriving unit 106 receives the second input digital pattern from the second input digital pattern generation unit 22Q (operating without the correction function) of the arbitrary waveform generator 2. Moreover, the second straight transmission characteristic deriving unit 106 receives the second output digital pattern from the second output digital pattern acquisition unit 42Q (operating without the correction function) of the digitizer 4. This second output digital pattern is considered as a signal when the second input analog pattern (refer to FIG. 2) is the second output analog pattern (refer to FIG. 1). The second straight transmission characteristic deriving unit 106 derives a second straight transmission characteristic which converts the second input digital pattern into the second output digital pattern.

The second cross transmission characteristic deriving unit 108 operates when the second output terminal 29Q and the first input terminal 41I are connected with each other. The second cross transmission characteristic deriving unit 108 receives the second input digital pattern from the second input digital pattern generation unit 22Q (operating without the correction function) of the arbitrary waveform generator 2. Moreover, the second cross transmission characteristic deriving unit 108 receives the first output digital pattern from the first output digital pattern acquisition unit 42I (operating without the correction function) of the digitizer 4. This first output digital pattern is considered as a signal when the first input analog pattern (refer to FIG. 2) is the second output analog pattern (refer to FIG. 1). The second cross transmission characteristic deriving unit 108 derives a second transmission characteristic which converts the second input digital pattern into the first output digital pattern.

The delay characteristic deriving unit 110 derives the delay characteristic based on the first straight transmission characteristic, the first cross transmission characteristic, the second straight transmission characteristic and the second cross transmission characteristic. It should be noted that the delay characteristic deriving unit 110 acquires the first straight transmission characteristic from the first straight transmission characteristic deriving unit 102, acquires the first cross transmission characteristic from the first cross transmission characteristic deriving unit 104, acquires the second straight transmission characteristic from the second straight transmission characteristic deriving unit 106, and acquires the second cross transmission characteristic from the second cross transmission characteristic deriving unit 108.

A description will now be given of the delay characteristic.

When the first output terminal 29I and the first input terminal 41I are connected with each other, a delay time caused by the first A/D converter 44I is represented by t1(f). Then, when the second output terminal 29Q and the second input terminal 41Q are connected with each other, a delay time caused by the second A/D converter 44Q is also t1(f).

On this occasion, a delay time t2(f) caused by the first A/D converter 44I when the second output terminal 29Q and the first input terminal 41I are connected with each other is essentially equal to t1(f). Moreover, the delay time caused by the second A/D converter 44Q when the first output terminal 29I and the second input terminal 41Q are connected with each other is also t2(f) and t2(f) is essentially equal to t1(f).

However, due to a difference between a sampling frequency used for the first D/A converter 24I and the second D/A converter 24Q and a sampling frequency used for the first A/D converter 44I and the second A/D converter 44Q and the like, t2(f) and t1(f) are different from each other. A quantity representing the difference between t2(f) and t1(f) is referred to as delay characteristic.

The delay characteristic deriving unit 110 represents $T_D(f)=t2(f)-t1(f)$ as an S parameter (frequency characteristic) and derives $H_{TD}(f)$ as the delay characteristic. $H_{TD}(f)$ can be derived as an equation (1) below.

$$H_{TD}(f) = \cos(P_{TD}) - j \cdot \sin(P_{TD}) \qquad (1)$$

It should be noted that $P_{TD}(f)$ can be derived as an equation (2) below.

$$P_{TD}(f) = \angle \left( \frac{H_{IQ}(f) \times H_{QI}(f)}{H_{II}(f) \times H_{QQ}(f)} \right) / 2 \qquad (2)$$

In the above equation (2), $H_{II}(f)$ is the first straight transmission characteristic, $H_{IQ}(f)$ is the first cross transmission characteristic, $H_{QQ}(f)$ is the second straight transmission characteristic, and $H_{QI}(f)$ is the second cross transmission characteristic.

The delay characteristic deriving unit 110 assigns the first straight transmission characteristic $H_{II}(f)$, the first cross transmission characteristic $H_{IQ}(f)$, the second straight transmission characteristic $H_{QQ}(f)$ and the second cross transmission characteristic $H_{QI}(f)$ to the equation (2), thereby deriving $P_{TD}(f)$. Moreover, the delay characteristic deriving unit 110 assigns the derived $P_{TD}(f)$ to the equation (1), thereby deriving the delay characteristic $H_{TD}(f)$.

A description will later be given of a proof of the delay characteristic being represented by the equation (1).

The generation-side transmission characteristic ratio deriving unit 112 receives the second cross transmission characteristic $H_{QI}(f)$ from the second cross transmission characteristic deriving unit 108, and receives the first straight transmission characteristic $H_{II}(f)$ from the first straight transmission characteristic deriving unit 102. Moreover, the generation-side transmission characteristic ratio deriving unit 112 receives the delay characteristic $H_{TD}(f)$ from the delay characteristic deriving unit 110. Further, the generation-side transmission characteristic ratio deriving unit 112 derives a generation-side transmission characteristic ratio which is obtained by dividing the second cross transmission characteristic $H_{QI}(f)$ by a product of the first straight transmission characteristic $H_{II}(f)$ and the delay characteristic $H_{TD}(f)$.

The generation-side transmission characteristic deriving unit 114 derives the second generation-side transmission characteristic $H_{A-Q}(f)$ by multiplying the first generation-side transmission characteristic $H_{A-I}(f)$ by the generation-side transmission characteristic ratio derived by the generation-side transmission characteristic ratio deriving unit 112. The second generation-side transmission characteristic $H_{A-Q}(f)$ is fed to the second input digital pattern generation unit 22Q and is used when the correction function of the second input digital pattern generation unit 22Q is used.

The acquisition-side transmission characteristic ratio deriving unit 116 receives the first cross transmission characteristic $H_{IQ}(f)$ from the first cross transmission characteristic deriving unit 104, and receives the first straight transmission characteristic $H_{II}(f)$ from the first straight transmission characteristic deriving unit 102. Moreover, the acquisition-side transmission characteristic ratio deriving unit 116 receives the delay characteristic $H_{TD}(f)$ from the delay characteristic deriving unit 110. Further, the acquisition-side transmission characteristic ratio deriving unit 116 derives an acquisition-side transmission characteristic ratio which is obtained by dividing the first cross transmission characteristic $H_{IQ}(f)$ by the product of the first straight transmission characteristic $H_{II}(f)$ and the delay characteristic $H_{TD}(f)$.

The acquisition-side transmission characteristic deriving unit 118 derives the second acquisition-side transmission characteristic $H_{D-Q}(f)$ by multiplying the first acquisition-side transmission characteristic $H_{D-I}(f)$ by the acquisition-side transmission characteristic ratio derived by the acquisition-side transmission characteristic ratio deriving unit 116. The second acquisition-side transmission characteristic $H_{D-Q}(f)$ is fed to the second output digital pattern acquisition unit 42Q and is used when the correction function of the second output digital pattern acquisition unit 42Q is used.

A description will now be given of an operation of the third embodiment.

First, the first output terminal 29I and the first input terminal 41I are connected with each other, and further, the second output terminal 29Q and the second input terminal 41Q are connected with each other.

Figure 10:
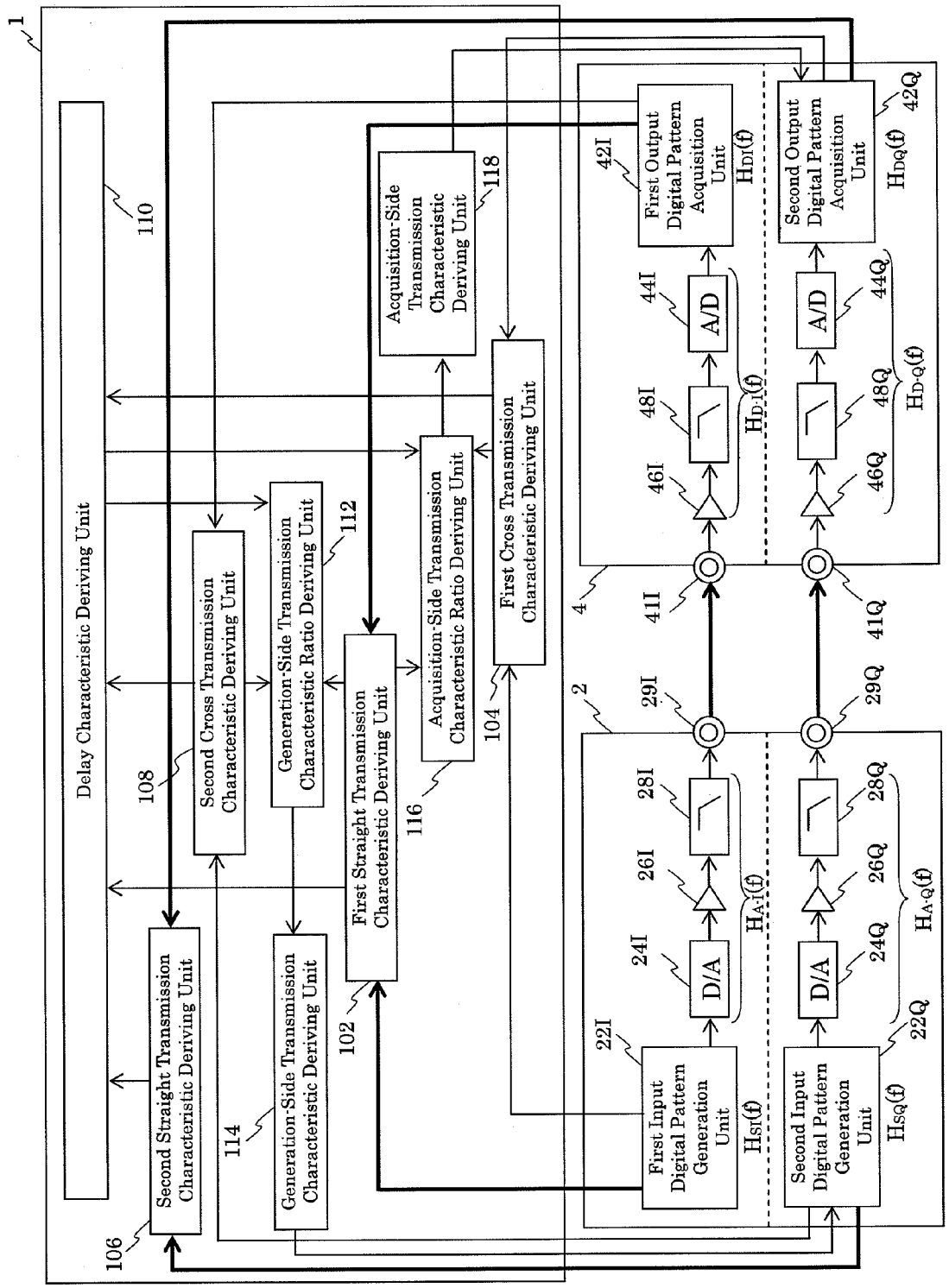
FIG. 10 illustrates an operation of the characteristic acquisition device 1 according to the third embodiment when the first output terminal 29I (second output terminal 29Q) and the first input terminal 41I (second input terminal 41Q) are connected with each other.

FIG. 10 illustrates an operation of the characteristic acquisition device 1 according to the third embodiment when the first output terminal 29I (second output terminal 29Q) and the first input terminal 41I (second input terminal 41Q) are connected with each other.

The first input digital pattern generation unit 22I of the arbitrary waveform generator 2 outputs the first input digital pattern $H_{SI}(f)$. Since the correction function of the first input digital pattern generation unit 22I is not used, $H_{SI}(f)/H_{A-I}(f)$ is not to be output.

The first input digital pattern $H_{SI}(f)$ is converted into the first output analog pattern by the first D/A converter 24I, the first output amplifier 26I and the first output filter 28I. The first output analog pattern is represented by $H_{SI}(f) \times H_{A-I}(f)$.

The first output analog pattern is output from the first output terminal 29I, and is input as the first input analog pattern to the first input terminal 41I of the digitizer 4.

The first input analog pattern is converted into the first output digital pattern by the first input amplifier 46I, the first input filter 48I and the first A/D converter 44I. The first output digital pattern $H_{DI}(f)$ is represented by $H_{SI}(f) \times H_{A-I}(f) \times H_{D-I}(f)$. The first output digital pattern acquisition unit 42I acquires the first output digital pattern $H_{SI}(f) \times H_{A-I}(f) \times H_{D-I}(f)$. Since the correction function of the first output digital pattern acquisition unit 42I is not used, the first output digital pattern acquisition unit 42I does not divide the output of the first A/D converter 44I by $H_{D-I}(f)$.

The first straight transmission characteristic deriving unit 102 receives the first input digital pattern $H_{SI}(f)$ from the first input digital pattern generation unit 22I, and receives the first output digital pattern $H_{DI}(f)$ ($=H_{SI}(f) \times H_{A-I}(f) \times H_{D-I}(f)$) from the first output digital pattern acquisition unit 42I. Moreover, the first straight transmission characteristic deriving unit 102 derives the first straight transmission characteristic which converts the first input digital pattern $H_{SI}(f)$ into the first output digital pattern $H_{DI}(f)$. In particular, the first straight transmission characteristic deriving unit 102 divides the first output digital pattern $H_{DI}(f)$ by the first input digital pattern $H_{SI}(f)$. Thus, the first straight transmission characteristic $H_{II}(f)$ is given by $H_{II}(f)=H_{DI}(f)/H_{SI}(f)=H_{A-I}(f) \times H_{D-I}(f)$.

The second input digital pattern generation unit 22Q of the arbitrary waveform generator 2 outputs the second input digital pattern $H_{SQ}(f)$. Since the correction function of the second input digital pattern generation unit 22Q is not used, $H_{SQ}(f)/H_{A-Q}(f)$ is not to be output.

The second input digital pattern $H_{SQ}(f)$ is converted into the second output analog pattern by the second D/A converter 24Q, the second output amplifier 26Q and the second output filter 28Q. The second output analog pattern is represented by $H_{SQ}(f) \times H_{A-Q}(f)$.

The second output analog pattern is output from the second output terminal 29Q, and is input as the second input analog pattern to the second input terminal 41Q of the digitizer 4.

The second input analog pattern is converted into the second output digital pattern by the second input amplifier 46Q, the second input filter 48Q and the second A/D converter 44Q. The second output digital pattern $H_{DQ}(f)$ is represented by $H_{SQ}(f) \times H_{A-Q}(f) \times H_{D-Q}(f)$. The second output digital pattern acquisition unit 42Q acquires the second output digital pattern $H_{SQ}(f) \times H_{A-Q}(f) \times H_{D-Q}(f)$. Since the correction function of the second output digital pattern acquisition unit 42Q is not used, the second output digital pattern acquisition unit 42Q does not divide the output of the second A/D converter 44Q by $H_{D-Q}(f)$.

The second straight transmission characteristic deriving unit 106 receives the second input digital pattern $H_{SQ}(f)$ from the second input digital pattern generation unit 22Q, and receives the second output digital pattern $H_{DQ}(f)$ ($=H_{SQ}(f) \times H_{A-Q}(f) \times H_{D-Q}(f)$) from the second output digital pattern acquisition unit 42Q. Moreover, the second straight transmission characteristic deriving unit 106 derives the second straight transmission characteristic which converts the second input digital pattern $H_{SQ}(f)$ into the second output digital pattern $H_{DQ}(f)$. In particular, the second straight transmission characteristic deriving unit 106 divides the second output digital pattern $H_{DQ}(f)$ by the second input digital pattern $H_{SQ}(f)$. Thus, the second straight transmission characteristic $H_{QQ}(f)$ is given by $H_{QQ}(f)=H_{DQ}(f)/H_{SQ}(f)=H_{A-Q}(f) \times H_{D-Q}(f)$.

Then, the first output terminal 29I and the second input terminal 41Q are connected with each other, and further, the second output terminal 29Q and the first input terminal 41I are connected with each other.

Figure 11:
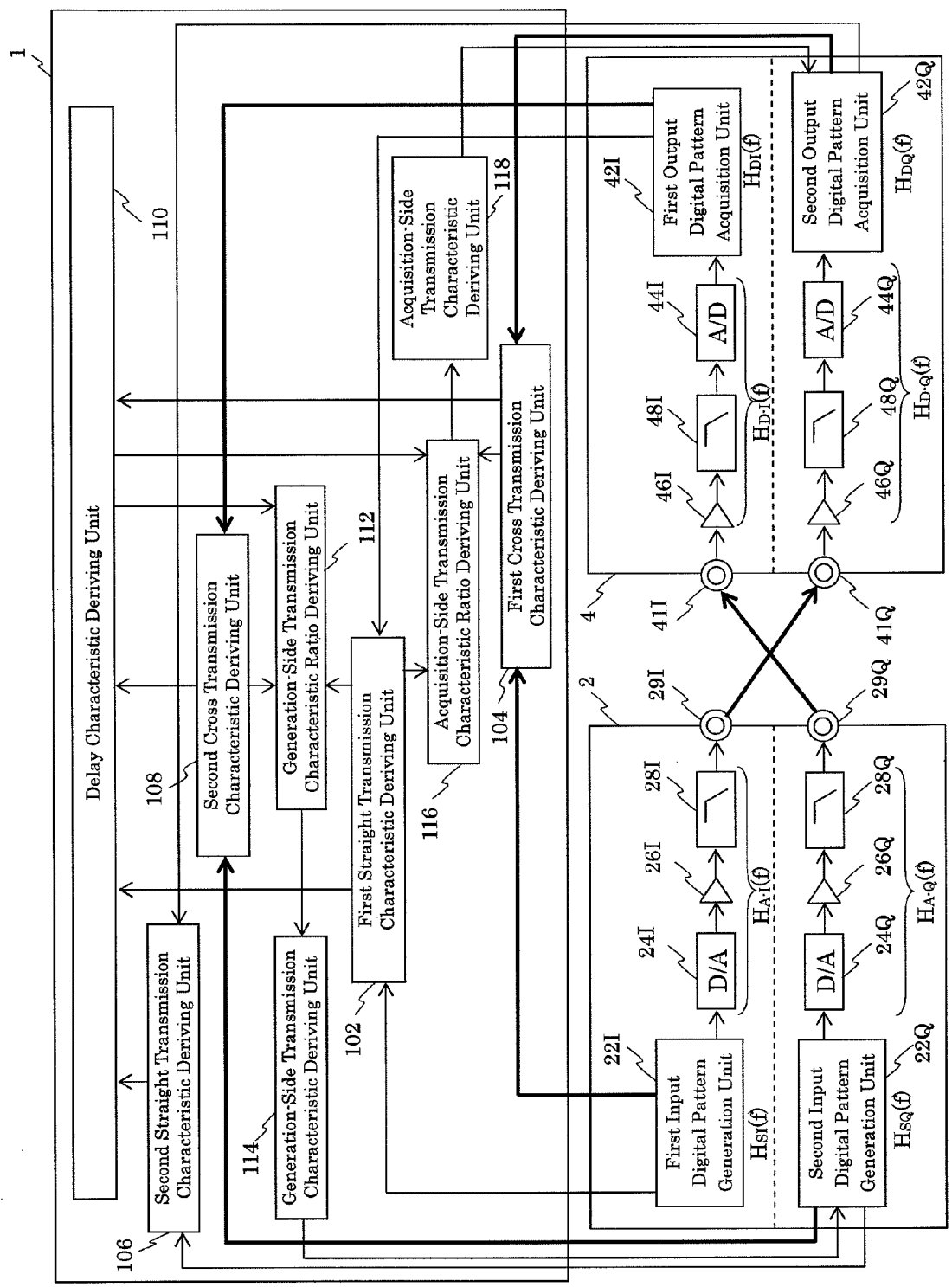
FIG. 11 illustrates an operation of the characteristic acquisition device 1 according to the third embodiment when the first output terminal 29I (second output terminal 29Q) and the second input terminal 41Q (first input terminal 41I) are connected with each other.

FIG. 11 illustrates an operation of the characteristic acquisition device 1 according to the third embodiment when the first output terminal 29I (second output terminal 29Q) and the second input terminal 41Q (first input terminal 41I) are connected with each other.

The first input digital pattern generation unit 22I of the arbitrary waveform generator 2 outputs the first input digital pattern $H_{SI}(f)$. Since the correction function of the first input digital pattern generation unit 22I is not used, $H_{SI}(f)/H_{A-I}(f)$ is not to be output.

The first input digital pattern $H_{SI}(f)$ is converted into the first output analog pattern by the first D/A converter 24I, the first output amplifier 26I and the first output filter 28I. The first output analog pattern is represented by $H_{SI}(f) \times H_{A-I}(f)$.

The first output analog pattern is output from the first output terminal 29I, and is input as the second input analog pattern to the second input terminal 41Q of the digitizer 4.

The second input analog pattern is converted into the second output digital pattern by the second input amplifier 46Q, the second input filter 48Q and the second A/D converter 44Q. The second output digital pattern $H_{DQ}(f)$ is represented by $H_{SI}(f) \times H_{A-I}(f) \times H_{D-Q}(f)$. The second output digital pattern acquisition unit 42Q acquires the second output digital pattern $H_{SI}(f) \times H_{A-I}(f) \times H_{D-Q}(f)$. Since the correction function of the second output digital pattern acquisition unit 42Q is not used, the second output digital pattern acquisition unit 42Q does not divide the output of the second A/D converter 44Q by $H_{D-Q}(f)$.

The first cross transmission characteristic deriving unit 104 receives the first input digital pattern $H_{SI}(f)$ from the first input digital pattern generation unit 22I, and receives the second output digital pattern $H_{DQ}(f)$ ($=H_{SI}(f) \times H_{A-I}(f) \times H_{D-Q}(f)$) from the second output digital pattern acquisition unit 42Q. Moreover, the first cross transmission characteristic deriving unit 104 derives the first cross transmission characteristic which converts the first input digital pattern $H_{SI}(f)$ into the second output digital pattern $H_{DQ}(f)$. In particular, the first cross transmission characteristic deriving unit 104 divides the second output digital pattern $H_{DQ}(f)$ by the first input digital pattern $H_{SI}(f)$. Thus, the first cross transmission characteristic $H_{IQ}(f)$ is given by $H_{IQ}(f)=H_{DQ}(f)/H_{SI}(f)=H_{A-I}(f) \times H_{D-Q}(f)$.

The second input digital pattern generation unit 22Q of the arbitrary waveform generator 2 outputs the second input digital pattern $H_{SQ}(f)$. Since the correction function of the second input digital pattern generation unit 22Q is not used, $H_{SQ}(f)/H_{A-Q}(f)$ is not to be output.

The second input digital pattern $H_{SQ}(f)$ is converted into the second output analog pattern by the second D/A converter 24Q, the second output amplifier 26Q and the second output filter 28Q. The second output analog pattern is represented by $H_{SQ}(f) \times H_{A-Q}(f)$.

The second output analog pattern is output from the second output terminal 29Q, and is input as the first input analog pattern to the first input terminal 41I of the digitizer 4.

The first input analog pattern is converted into the first output digital pattern by the first input amplifier 46I, the first input filter 48I and the first A/D converter 44I. The first output digital pattern $H_{DI}(f)$ is represented by $H_{SQ}(f) \times H_{A-Q}(f) \times H_{D-I}(f)$. The first output digital pattern acquisition unit 42I acquires the first output digital pattern $H_{SQ}(f) \times H_{A-Q}(f) \times H_{D-I}(f)$. Since the correction function of the first output digital pattern acquisition unit 42I is not used, the first output digital pattern acquisition unit 42I does not divide the output of the first A/D converter 44I by $H_{D-I}(f)$.

The second cross transmission characteristic deriving unit 108 receives the second input digital pattern $H_{SQ}(f)$ from the second input digital pattern generation unit 22Q, and receives the first output digital pattern $H_{DI}(f)$ (=$H_{SQ}(f) \times H_{A-Q}(f) \times H_{D-I}(f)$) from the first output digital pattern acquisition unit 42I. Moreover, the second cross transmission characteristic deriving unit 108 derives the second cross transmission characteristic which converts the second input digital pattern $H_{SQ}(f)$ into the first output digital pattern $H_{DI}(f)$. In particular, the second cross transmission characteristic deriving unit 108 divides the first output digital pattern $H_{DI}(f)$ by the second input digital pattern $H_{SQ}(f)$. Thus, the second transmission characteristic $H_{QI}(f)$ is given by $H_{QI}(f)=H_{DI}(f)/H_{SQ}(f)=H_{A-Q}(f) \times H_{D-I}(f)$.

The delay characteristic deriving unit 110 acquires the first straight transmission characteristic $H_{II}(f)$ from the first straight transmission characteristic deriving unit 102, acquires the first cross transmission characteristic $H_{IQ}(f)$ from the first cross transmission characteristic deriving unit 104, acquires the second straight transmission characteristic $H_{QQ}(f)$ from the second straight transmission characteristic deriving unit 106, and acquires the second cross transmission characteristic $H_{QI}(f)$ from the second cross transmission characteristic deriving unit 108.

Moreover, the delay characteristic deriving unit 110 assigns the first straight transmission characteristic $H_{II}(f)$, the first cross transmission characteristic $H_{IQ}(f)$, the second straight transmission characteristic $H_{QQ}(f)$ and the second cross transmission characteristic $H_{QI}(f)$ to the equation (2), thereby deriving $P_{TD}(f)$. Further, the delay characteristic deriving unit 110 assigns the derived $P_{TD}(f)$ to the equation (1), thereby deriving the delay characteristic $H_{TD}(f)$.

The generation-side transmission characteristic ratio deriving unit 112 receives the first straight transmission characteristic $H_{II}(f)$ from the first straight transmission characteristic deriving unit 102, and receives the second cross transmission characteristic $H_{QI}(f)$ from the second cross transmission characteristic deriving unit 108. Moreover, the generation-side transmission characteristic ratio deriving unit 112 receives the delay characteristic $H_{TD}(f)$ from the delay characteristic deriving unit 110. Further, the generation-side transmission characteristic ratio deriving unit 112 derives the generation-side transmission characteristic ratio which is obtained by dividing the second cross transmission characteristic $H_{QI}(f)$ by a product of the first straight transmission characteristic $H_{II}(f)$ and the delay characteristic $H_{TD}(f)$.

Since the second cross transmission characteristic $H_{QI}(f)$ is given by $H_{QI}(f)=H_{A-Q}(f) \times H_{D-I}(f)$ and the first straight transmission characteristic $H_{II}(f)$ is given by $H_{II}(f)=H_{A-I}(f) \times H_{D-I}(f)$, the generation-side transmission characteristic ratio is given by $H_{QI}(f)/H_{II}(f)=H_{A-Q}(f)/H_{A-I}(f)$ if $T_D(f)=0$. However, since the condition $T_D(f)=0$ does not hold, the generation-side transmission characteristic ratio is represented by $H_{A-Q}(f)/H_{A-I}(f)=H_{QI}(f)/H_{QI}(f)/(H_{II}(f) \times H_{TD}(f))$.

The generation-side transmission characteristic deriving unit 114 receives the generation-side transmission characteristic ratio from the generation-side transmission characteristic ratio deriving unit 112. Moreover, the generation-side transmission characteristic deriving unit 114 records the first generation-side transmission characteristic $H_{A-I}(f)$. Further, the generation-side transmission characteristic deriving unit 114 derives the second generation-side transmission characteristic $H_{A-Q}(f)$ by multiplying the first generation-side transmission characteristic $H_{A-I}(f)$ by the generation-side transmission characteristic ratio $H_{A-Q}(f)/H_{A-I}(f)$ derived by the generation-side transmission characteristic ratio deriving unit 112. The second generation-side transmission characteristic $H_{A-Q}(f)$ is fed to the second input digital pattern generation unit 22Q.

The acquisition-side transmission characteristic ratio deriving unit 116 receives the first straight transmission characteristic $H_{II}(f)$ from the first straight transmission characteristic deriving unit 102, and receives the first cross transmission characteristic $H_{IQ}(f)$ from the first cross transmission characteristic deriving unit 104. Moreover, the acquisition-side transmission characteristic ratio deriving unit 116 receives the delay characteristic $H_{TD}(f)$ from the delay characteristic deriving unit 110. Further, the acquisition-side transmission characteristic ratio deriving unit 116 derives the acquisition-side transmission characteristic ratio which is obtained by dividing the first cross transmission characteristic $H_{IQ}(f)$ by the product of the first straight transmission characteristic $H_{II}(f)$ and the delay characteristic $H_{TD}(f)$.

Since the first cross transmission characteristic $H_{IQ}(f)$ is given by $H_{IQ}(f)=H_{A-I}(f) \times H_{D-Q}(f)$ and the first straight transmission characteristic $H_{II}(f)$ is given by $H_{II}(f)=H_{A-I}(f) \times H_{D-I}(f)$, the acquisition-side transmission characteristic ratio is given by $H_{IQ}(f)/H_{II}(f)=H_{D-Q}(f)/H_{D-I}(f)$ if $T_D(f)=0$. However, since the condition $T_D(f)=0$ does not hold, the acquisition-side transmission characteristic ratio is represented by $H_{D-Q}(f)/H_{D-I}(f)=H_{IQ}(f)/(H_{IQ}(f)/(H_{II}(f) \times H_{TD}(f)))$.

The acquisition-side transmission characteristic deriving unit 118 receives the acquisition-side transmission characteristic ratio from the acquisition-side transmission characteristic ratio deriving unit 116. Moreover, the acquisition-side transmission characteristic deriving unit 118 records the first acquisition-side transmission characteristic $H_{D-I}(f)$. Further, the acquisition-side transmission characteristic deriving unit 118 derives the second acquisition-side transmission characteristic $H_{D-Q}(f)$ by multiplying the first acquisition-side transmission characteristic $H_{D-I}(f)$ by the acquisition-side transmission characteristic ratio $H_{D-Q}(f)/H_{D-I}(f)$ derived by the acquisition-side transmission characteristic ratio deriving unit 116. The second acquisition-side transmission characteristic $H_{D-Q}(f)$ is fed to the second output digital pattern generation unit 42Q.

Then, the arbitrary waveform generator 2 is disconnected from the characteristic acquisition device 1 and the digitizer 4, and is used for generating the first output analog pattern and the second output analog pattern. On this occasion, the correction function of the first input digital pattern generation unit 22I and the correction function of the second input digital pattern generation unit 22Q are used.

Moreover, the digitizer 4 is disconnected from the characteristic acquisition device 1 and the arbitrary waveform generator 2, and is used for acquiring the first output digital pattern and the second output digital pattern from the first input analog pattern and the second input analog pattern. On this occasion, the correction function of the first output digital pattern acquisition unit 42I and the correction function of the second output digital pattern acquisition unit 42Q are used.

According to the third embodiment, there are obtained effects similar to those of the first and second embodiments. Moreover, it is possible to more precisely reduce the errors in consideration of the delay characteristic $H_{TD}(f)$.

Moreover, the above-described embodiment may be realized in the following manner. A computer is provided with a CPU, a hard disk and a media (such as a floppy disk (registered trade mark) and a CD-ROM reader, and the media reader is caused to read a medium recording a program realizing the above-described respective components (such as the characteristic acquisition unit 1), thereby installing the program on the hard disk. This method may also realize the above-described functions.

[Proof of the Delay Characteristic being Represented by the Equation (1)]

First, notations are defined as follows.

$t_{A-I}$: A period required for the processing by the first D/A converter 24I, the first output amplifier 26I and the first output filter 28I.

$t_{A-Q}$: A period required for the processing by the second D/A converter 24Q, the second output amplifier 26Q and the second output filter 28Q.

$t_{D-I}$: A period required for the processing by the first input amplifier 46I and the first input filter 48I.

$t_{D-Q}$: A period required for the processing by the second input amplifier 46Q and the second input filter 48Q.

It should be noted that $t_{A-I}$, $t_{A-Q}$, $t_{D-I}$ and $t_{D-Q}$ are functions of the input frequency f.

$T_{II}$: A period from the generation of the first input digital pattern to the acquisition of the first output digital pattern when the first output terminal 29I and the first input terminal 41I are connected with each other.

$T_{IQ}$: A period from the generation of the first input digital pattern to the acquisition of the second output digital pattern when the first output terminal 29I and the second input terminal 41Q are connected with each other.

$T_{QI}$: A period from the generation of the second input digital pattern to the acquisition of the first output digital pattern when the second output terminal 29Q and the first input terminal 41I are connected with each other.

$T_{QQ}$: A period from the generation of the second input digital pattern to the acquisition of the second output digital pattern when the second output terminal 29Q and the second input terminal 41Q are connected with each other.

Moreover, the definitions of t1(f) and t2(f) are as described above. Notations t1(f) and t2(f) are respectively rewritten as t1 and t2.

Then, the above periods are represented by:

$$T_{II} = t_{A-I} + t_{D-I} + t1$$

$$T_{IQ} = t_{A-I} + t_{D-Q} + t2$$

$$T_{QI} = t_{A-Q} + t_{D-I} + t2$$

$$T_{QQ} = t_{A-Q} + t_{D-Q} + t1$$

Thus, an equation (3) below can be given:

$$T_D(f) = t2 - t1 = ((T_{IQ} + T_{QI}) - (T_{II} + T_{QQ}))/2 \quad (3)$$

On this occasion, $T_{II}$, $T_{IQ}$, $T_{QI}$ and $T_{QQ}$ represented by S parameters are respectively the first straight transmission characteristic $H_{II}(f)$, the first cross transmission characteristic $H_{IQ}(f)$, the second cross transmission characteristic $H_{QI}(f)$ and the second straight transmission characteristic $H_{QQ}(f)$.

In the equation (3), by respectively converting $T_{II}$, $T_{IQ}$, $T_{QI}$ and $T_{QQ}$ to $H_{II}(f)$, $H_{IQ}(f)$, $H_{QI}(f)$ and $H_{QQ}(f)$, and respectively replacing addition by multiplication and subtraction by division, $T_D(f)$ can be converted into a phase difference $P_{TD}(f)$. Then, the equation (2), which derives $P_{TD}(f)$, is obtained.

Moreover, the equation (1), which derives $H_{TD}(f)$, is obtained by converting the phase difference $P_{TD}(f)$ into an S parameter.

2 Arbitrary Waveform Generator (Analog Pattern Generation Device)
4 Digitizer (Digital Pattern Acquisition Device)
1 Characteristic Acquisition Device
12 First Transmission Characteristic Deriving Unit
14 Second Transmission Characteristic Deriving Unit
16 Transmission Characteristic Ratio Deriving Unit
18 Transmission Characteristic Deriving Unit
11 First Transmission Characteristic Deriving Unit
13 Second Transmission Characteristic Deriving Unit
15 Transmission Characteristic Ratio Deriving Unit
17 Transmission Characteristic Deriving Unit
102 First Straight Transmission Characteristic Deriving Unit
104 First Cross Transmission Characteristic Deriving Unit
106 Second Straight Transmission Characteristic Deriving Unit
108 Second Cross Transmission Characteristic Deriving Unit
110 Delay Characteristic Deriving Unit
112 Generation-side Transmission Characteristic Ratio Deriving Unit
114 Generation-side Transmission Characteristic Deriving Unit
116 Acquisition-side Transmission Characteristic Ratio Deriving Unit
118 Acquisition-side Transmission Characteristic Deriving Unit
$H_{II}(f)$ First Straight Transmission Characteristic (First Transmission Characteristic)
$H_{IQ}(f)$ First Cross Transmission Characteristic (Second Transmission Characteristic)
$H_{QQ}(f)$ Second Straight Transmission Characteristic
$H_{QI}(f)$ Second Cross Transmission Characteristic (Second Transmission Characteristic)
$H_{A-I}(f)$ First Generation-side Transmission Characteristic
$H_{A-Q}(f)$ Second Generation-side Transmission Characteristic
$H_{D-I}(f)$ First Acquisition-side Transmission Characteristic
$H_{D-Q}(f)$ Second Acquisition-side Transmission Characteristic

The invention claimed is:

1. A characteristic acquisition device which receives patterns from an analog pattern generator and a digital pattern acquirer for acquiring a characteristic of the analog pattern generator, wherein:
   the analog pattern generator converts a first input digital pattern into a first output analog pattern, and converts a second input digital pattern into a second output analog pattern;
   the digital pattern acquirer converts an input analog pattern into an output digital pattern; and
   the characteristic acquisition device comprises:
      a first transmission characteristic deriver that derives a first transmission characteristic which converts the first input digital pattern into the output digital pattern where the input analog pattern is the first output analog pattern;
      a second transmission characteristic deriver that derives a second transmission characteristic which converts the second input digital pattern into the output digital pattern where the input analog pattern is the second output analog pattern; and
      a transmission characteristic ratio deriver that derives a transmission characteristic ratio which is a ratio relating to the first transmission characteristic and the second transmission characteristic.

2. The characteristic acquisition device according to claim 1, further comprising:
   a third transmission characteristic deriver that derives a second generation-side transmission characteristic which converts the second input digital pattern into the second output analog pattern by multiplying a first generation-side transmission characteristic which converts the first input digital pattern into the first output analog pattern by the transmission characteristic ratio.

3. A characteristic acquisition device which receives patterns from an analog pattern generator and a digital pattern acquirer for acquiring a characteristic of the digital pattern acquirer, wherein:
the analog pattern generator converts an input digital pattern into an output analog pattern;
the digital pattern acquirer converts a first input analog pattern into a first output digital pattern, and converts a second input analog pattern into a second output digital pattern; and
the characteristic acquisition device comprises:
a first transmission characteristic deriver that derives a first transmission characteristic which converts the input digital pattern into the first output digital pattern where the first input analog pattern is the output analog pattern;
a second transmission characteristic deriver that derives a second transmission characteristic which converts the input digital pattern into the second output digital pattern where the second input analog pattern is the output analog pattern; and
a transmission characteristic ratio deriver that derives a transmission characteristic ratio which is a ratio relating to the first transmission characteristic and the second transmission characteristic.

4. The characteristic acquisition device according to claim 3, further comprising:
a third transmission characteristic deriver that derives a second acquisition-side transmission characteristic which converts the second input analog pattern into the second output digital pattern by multiplying a first acquisition-side transmission characteristic which converts the first input analog pattern into the first output digital pattern by the transmission characteristic ratio.

5. A characteristic acquisition device which receives patterns from an analog pattern generator and a digital pattern acquirer for acquiring a delay characteristic in a transmission path from the analog pattern generator to the digital pattern acquirer, wherein:
the analog pattern generator converts a first input digital pattern into a first output analog pattern, and converts a second input digital pattern into a second output analog pattern;
the digital pattern acquirer converts a first input analog pattern into a first output digital pattern, and converts a second input analog pattern into a second output digital pattern; and
the characteristic acquisition device comprises:
a first straight transmission characteristic deriver that derives a first straight transmission characteristic which converts the first input digital pattern into the first output digital pattern where the first input analog pattern is the first output analog pattern;
a first cross transmission characteristic deriver that derives a first cross transmission characteristic which converts the first input digital pattern into the second output digital pattern where the second input analog pattern is the first output analog pattern;
a second straight transmission characteristic deriver that derives a second straight transmission characteristic which converts the second input digital pattern into the second output digital pattern where the second input analog pattern is the second output analog pattern;
a second cross transmission characteristic deriver that derives a second cross transmission characteristic which converts the second input digital pattern into the first output digital pattern where the first input analog pattern is the second output analog pattern; and
a delay characteristic deriver that derives the delay characteristic based on the first straight transmission characteristic, the first cross transmission characteristic, the second straight transmission characteristic, and the second cross transmission characteristic.

6. The characteristic acquisition device according to claim 5, further comprising:
a generation-side transmission characteristic ratio deriver that derives a generation-side transmission characteristic ratio which is obtained by dividing the second cross transmission characteristic by a product of the first straight transmission characteristic and the delay characteristic.

7. The characteristic acquisition device according to claim 6, further comprising:
a generation-side transmission characteristic deriver that derives a second generation-side transmission characteristic which converts the second input digital pattern into the second output analog pattern by multiplying a first generation-side transmission characteristic which converts the first input digital pattern into the first output analog pattern by the generation-side transmission characteristic ratio.

8. The characteristic acquisition device according to claim 5, further comprising:
an acquisition-side transmission characteristic ratio deriver that derives an acquisition-side transmission characteristic ratio which is obtained by dividing the first cross transmission characteristic by a product of the first straight transmission characteristic and the delay characteristic.

9. The characteristic acquisition device according to claim 8, further comprising:
an acquisition-side transmission characteristic deriver that derives a second acquisition-side transmission characteristic which converts the second input analog pattern into the second output digital pattern by multiplying a first acquisition-side transmission characteristic which converts the first input analog pattern into the first output digital pattern by the acquisition-side transmission characteristic ratio.

10. A characteristic acquisition method of receiving patterns from an analog pattern generator and a digital pattern acquirer for acquiring a characteristic of the analog pattern generator, wherein:
the analog pattern generator converts a first input digital pattern into a first output analog pattern, and converts a second input digital pattern into a second output analog pattern;
the digital pattern acquirer converts an input analog pattern into an output digital pattern; and
the characteristic acquisition method comprises:
deriving a first transmission characteristic which converts the first input digital pattern into the output digital pattern where the input analog pattern is the first output analog pattern;
deriving a second transmission characteristic which converts the second input digital pattern into the output digital pattern where the input analog pattern is the second output analog pattern; and
deriving a transmission characteristic ratio which is a ratio relating to the first transmission characteristic and the second transmission characteristic.

11. A characteristic acquisition method of receiving patterns from an analog pattern generator and a digital pattern acquirer for acquiring a characteristic of the digital pattern acquirer, wherein:
- the analog pattern generator converts an input digital pattern into an output analog pattern;
- the digital pattern acquirer converts a first input analog pattern into a first output digital pattern, and converts a second input analog pattern into a second output digital pattern; and
- the characteristic acquisition method comprises:
  - deriving a first transmission characteristic which converts the input digital pattern into the first output digital pattern where the first input analog pattern is the output analog pattern;
  - deriving a second transmission characteristic which converts the input digital pattern into the second output digital pattern where the second input analog pattern is the output analog pattern; and
  - deriving a transmission characteristic ratio which is a ratio relating to the first transmission characteristic and the second transmission characteristic.

12. A characteristic acquisition method of receiving patterns from an analog pattern generator and a digital pattern acquirer for acquiring a delay characteristic in a transmission path from the analog pattern generator to the digital pattern acquirer, wherein:
- the analog pattern generator converts a first input digital pattern into a first output analog pattern, and converts a second input digital pattern into a second output analog pattern;
- the digital pattern acquirer converts a first input analog pattern into a first output digital pattern, and converts a second input analog pattern into a second output digital pattern; and
- the characteristic acquisition method comprises:
  - deriving a first straight transmission characteristic which converts the first input digital pattern into the first output digital pattern where the first input analog pattern is the first output analog pattern;
  - deriving a first cross transmission characteristic which converts the first input digital pattern into the second output digital pattern where the second input analog pattern is the first output analog pattern;
  - deriving a second straight transmission characteristic which converts the second input digital pattern into the second output digital pattern where the second input analog pattern is the second output analog pattern;
  - deriving a second cross transmission characteristic which converts the second input digital pattern into the first output digital pattern where the first input analog pattern is the second output analog pattern; and
  - deriving the delay characteristic based on the first straight transmission characteristic, the first cross transmission characteristic, the second straight transmission characteristic, and the second cross transmission characteristic.

13. A non-transitory computer-readable medium including a program of instructions for execution by a computer to perform a characteristic acquisition process of receiving patterns from an analog pattern generator and a digital pattern acquirer for acquiring a characteristic of the analog pattern generator, wherein:
- the analog pattern generator converts a first input digital pattern into a first output analog pattern, and converts a second input digital pattern into a second output analog pattern; and
- the digital pattern acquirer converts an input analog pattern into an output digital pattern,
- the characteristic acquisition process comprising:
  - deriving a first transmission characteristic which converts the first input digital pattern into the output digital pattern where the input analog pattern is the first output analog pattern;
  - deriving a second transmission characteristic which converts the second input digital pattern into the output digital pattern where the input analog pattern is the second output analog pattern; and
  - deriving a transmission characteristic ratio which is a ratio relating to the first transmission characteristic and the second transmission characteristic.

14. A non-transitory computer-readable medium including a program of instructions for execution by a computer to perform a characteristic acquisition process of receiving patterns from an analog pattern generator and a digital pattern acquirer for acquiring a characteristic of the digital pattern acquirer, wherein:
- the analog pattern generator converts an input digital pattern into an output analog pattern; and
- the digital pattern acquirer converts a first input analog pattern into a first output digital pattern, and converts a second input analog pattern into a second output digital pattern,
- the characteristic acquisition process comprising:
  - deriving a first transmission characteristic which converts the input digital pattern into the first output digital pattern where the first input analog pattern is the output analog pattern;
  - deriving a second transmission characteristic which converts the input digital pattern into the second output digital pattern where the second input analog pattern is the output analog pattern; and
  - deriving a transmission characteristic ratio which is a ratio relating to the first transmission characteristic and the second transmission characteristic.

15. A non-transitory computer-readable medium including a program of instructions for execution by a computer to perform a characteristic acquisition process of receiving patterns from an analog pattern generator and a digital pattern acquirer for acquiring a delay characteristic in a transmission path from the analog pattern generator to the digital pattern acquirer, wherein:
- the analog pattern generator converts a first input digital pattern into a first output analog pattern, and converts a second input digital pattern into a second output analog pattern; and
- the digital pattern acquirer converts a first input analog pattern into a first output digital pattern, and converts a second input analog pattern into a second output digital pattern,
- the characteristic acquisition process comprising:
  - deriving a first straight transmission characteristic which converts the first input digital pattern into the first output digital pattern where the first input analog pattern is the first output analog pattern;
  - deriving a first cross transmission characteristic which converts the first input digital pattern into the second output digital pattern where the second input analog pattern is the first output analog pattern;

deriving a second straight transmission characteristic which converts the second input digital pattern into the second output digital pattern where the second input analog pattern is the second output analog pattern;

deriving a second cross transmission characteristic which converts the second input digital pattern into the first output digital pattern where the first input analog pattern is the second output analog pattern; and deriving the delay characteristic based on the first straight transmission characteristic, the first cross transmission characteristic, the second straight transmission characteristic, and the second cross transmission characteristic.

16. The characteristic acquisition method according to claim 10, further comprising:

deriving a second generation-side transmission characteristic which converts the second input digital pattern into the second output analog pattern by multiplying a first generation-side transmission characteristic which converts the first input digital pattern into the first output analog pattern by the transmission characteristic ratio.

17. The characteristic acquisition method according to claim 11, further comprising:

deriving a second acquisition-side transmission characteristic which converts the second input analog pattern into the second output digital pattern by multiplying a first acquisition-side transmission characteristic which converts the first input analog pattern into the first output digital pattern by the transmission characteristic ratio.

18. The non-transitory computer-readable medium according to claim 13, further comprising:

deriving a second generation-side transmission characteristic which converts the second input digital pattern into the second output analog pattern by multiplying a first generation-side transmission characteristic which converts the first input digital pattern into the first output analog pattern by the transmission characteristic ratio.

19. The non-transitory computer-readable medium according to claim 14, further comprising:

deriving a second acquisition-side transmission characteristic which converts the second input analog pattern into the second output digital pattern by multiplying a first acquisition-side transmission characteristic which converts the first input analog pattern into the first output digital pattern by the transmission characteristic ratio.

* * * * *